(12) United States Patent
Mazet

(10) Patent No.: US 8,293,030 B2
(45) Date of Patent: Oct. 23, 2012

(54) INTERMETALLIC COMPOUNDS, THEIR USE AND A PROCESS FOR PREPARING THE SAME

(75) Inventor: Thomas Mazet, Villers-les-Nancy (FR)

(73) Assignee: Universite de Lorraine, Nancy (FR)

( * ) Notice: Subject to any disclaimer, the term of this patent is extended or adjusted under 35 U.S.C. 154(b) by 214 days.

(21) Appl. No.: 12/594,745

(22) PCT Filed: Mar. 31, 2008

(86) PCT No.: PCT/EP2008/053807
§ 371 (c)(1),
(2), (4) Date: Jul. 6, 2010

(87) PCT Pub. No.: WO2008/122535
PCT Pub. Date: Oct. 16, 2008

(65) Prior Publication Data
US 2010/0276627 A1    Nov. 4, 2010

(30) Foreign Application Priority Data
Apr. 5, 2007   (WO) ................. PCT/EP2007/053405

(51) Int. Cl.
*H01F 1/147* (2006.01)
*H01F 1/047* (2006.01)

(52) U.S. Cl. ............ 148/314; 148/315; 148/300; 62/3.1

(58) Field of Classification Search ........................ None
See application file for complete search history.

(56) References Cited

U.S. PATENT DOCUMENTS

2007/0072077 A1* 3/2007 Kusumoto et al. ......... 429/218.1
2011/0049413 A1* 3/2011 Mazet ............................ 252/67

FOREIGN PATENT DOCUMENTS

WO    20060074790    7/2006

OTHER PUBLICATIONS

Mazet et al., "Mn3Sn2: A Promising Material for Magnetic Refrigeration", Applied Physics Letters, Jul. 10, 2006, pp. 22503-1-22503-3, vol. 89, No. 2, American Institute of Physics, Melville, NY, USA, XP012086976.

Fjelllvag et al., "Crystal Structure and Phase Relations for Mn3Sn2 and Non-Stoichiometric Mn2-xSn", Journal of Alloys and Compounds, Aug. 22, 1997, pp. 140-144, vol. 259, Elsevier, Sequoia, Lausanne, CH, XP004094097.

* cited by examiner

*Primary Examiner* — John Sheehan
(74) *Attorney, Agent, or Firm* — Young & Thompson

(57) ABSTRACT

The present invention relates to new intermetallic compounds having a crystalline structure of $Ni_3Sn_2$ type for the magnetic refrigeration, their use and a process for preparing the same. The present invention further relates to new magnetocaloric compositions for the magnetic refrigeration and their use.

28 Claims, 18 Drawing Sheets

A

| Atome | position | x | y | z |
|---|---|---|---|---|
| $Mn_1$ | 8d | ≈ 0.22 | ≈ 0.01 | ≈ 0.12 |
| $Mn_2$ | 4c | ≈ 0.91 | 1/4 | ≈ 0.12 |
| $Sn_1$ | 4c | ≈ 0.60 | 1/4 | ≈ 0.64 |
| $Sn_2$ | 4c | ≈ 0.56 | 1/4 | ≈ 0.09 |
| Cell parameters : a ≈ 7.553 Å ; b ≈ 5.502 Å ; c ≈ 8.582 Å |||||

B

A           B

| Atome | position | x | y | z | Occup. |
|---|---|---|---|---|---|
| $Mn_1$ | 2a | 0 | 0 | 0 | 1.00 |
| $Mn_2$ | 2d | 1/3 | 2/3 | 3/4 | ≈ 0.60 |
| Sn | 2c | 1/3 | 2/3 | 1/4 | 1.00 |
| Cell parameters : a ≈ 4.40 Å ; c ≈ 5.51 Å | | | | | |

C

A

B

C

INTERMETALLIC COMPOUNDS, THEIR USE AND A PROCESS FOR PREPARING THE SAME

The present invention relates to new intermetallic compounds, their use and a process for preparing the same.

Current refrigeration systems and air conditioners are based on conventional gas compression and still use ozone-depleting or global warming volatile liquid refrigerant, thus representing a great environmental impact.

To circumvent these drawbacks, magnetic refrigeration using magnetocaloric compounds has been developed.

The magnetic refrigeration is expected to become competitive with conventional gas compression in a near future because of its higher efficiency and its lower environmental impact (Gschneidner K. A. et al., *Annu. Rev. Mater. Sci.*, 30, 387, 2000; Tishin A. M. et al., *The magnetocaloric effect and its applications*, Institute of physics Publishing, Bristol, 2003; Gschneidner K. A. et al., *Rep. Prog., Phys.* 68, 1479, 2005) and the magnetocaloric effect (MCE), widely speaking the adiabatic temperature change ($\Delta T_{ad}$) or the isothermal magnetic entropy change ($\Delta S_M$) of a solid in a varying magnetic field, is the heart of this cooling technique.

Since the discovery of the giant magnetocaloric effect (GMCE) in $Gd_5Si_2Ge_2$ (Pecharsky V. K. et al., *Phys. Rev. Lett.* 78, 4494, (1997), there has been a significant increase in prospecting on refrigerant materials.

Giant magnetocaloric properties are generally connected to first-order magnetic transitions (FOMT) which yield an intense but sharp response by opposition with the broader and less intense peak produced by second-order magnetic transitions (SOMT).

The phase transition can be a first-order phase transition which exhibits a discontinuity in the first derivative of the free energy with a thermodynamic variable, or a second-order phase transition which have a discontinuity in a second derivative of the free energy.

In a first order phase transition, there is a latent heat, the change from one phase to another is abrupt and a structural modification is possible.

Research has first been mostly restricted to rare earth compounds due to their high magnetic moment. Thus, U.S. Pat. No. 5,362,339 discloses magnetocaloric compounds having the following general formula $Ln_aA_bM_c$ wherein Ln is a rare earth element selected from the group consisting of Ce, Pr, Nd, Sm, Eu, Gd, Tb, Dy, Ho, Er, Tm and Yb, A is Al or Ga and M is selected from the group consisting of Fe, Co, Ni, Cu and Ag.

However these magnetocaloric compounds have two major drawbacks, a high cost due to the presence of expensive elements such as Gd and a temperature of use which is too low to be applicable near or above room temperature, i.e. from about 200 to about 600K.

Another interesting type of materials is rare earth-transition metal compounds crystallising in the cubic $NaZn_{13}$ type of structure. Recently, because of the extremely sharp magnetic ordering transition, the (La,Fe,Si,Al) system was reinvestigated. U.S. Pat. No. 7,063,754 discloses compounds of formula $La(Fe_{1-x}M_x)_{13}H_z$ where M is selected from the group consisting of Si and Al. These compounds provide a magnetic material exhibiting magnetic phase transition in the room temperature region.

Nevertheless, the temperature of use is too limited and not compatible with various industrial systems. Furthermore, at the transition phase in $La(Fe,Si)_{13}$ type of alloys, a volume change of 1.5% is also observed (Wang et al., *J. Phys. Condens Matter*, 15, 5269-5278, 2003). If this volume change is performed very frequently the material definitely becomes very brittle and may break into even smaller grains. This can have a distinct influence on the corrosion resistance of the material and thus on the life time of a refrigerator (Brück E., *J. Phys. D: Appl. Phys.* 38, R381-R391, 2005).

The only way to circumvent this limited temperature of use is to make a composition comprising two compounds having different transitions temperatures and therefore leading to a broadened temperature of use.

However, this solution is not satisfying because it leads to a material with a less intense response due to the lower ratio of each compound.

Further, each of the compounds works in turn depending on its transition temperature. Therefore, the response of this type of compound is not constant.

Despite their lower atomic moments, intermetallic manganese(Mn)-based compounds are now especially studied because they often order near or above room temperature and are comparatively cheap. The more outstanding behaviours have been found in $FeMnP_{1-x}As_x$ (WO 2003/012801, WO 2004/068512) and $MnAs_{1-x}Sb_x$ (WO 03/009314) that exhibit a GMCE comparable to that of $Gd_5Si_2Ge_2$ around room temperature. However, in spite of reduced materials costs, the presence of the highly toxic material As does not allow an industrial use of these compounds.

Further, the hysteresis loss, i.e. systems that do not return completely to their original state: that is, systems the states of which depend on their immediate history, is a phenomena inherent in FOMT magnetic and ferromagnetic materials.

Moreover, the slow kinetic, also inherent in FOMT, may reduce the actual efficiency of the GMCE materials in fast-cycling refrigerators (Gschneidner K. A. et al., *Rep. Prog., Phys.* 68, 1479, 2005; Provenzano V. et al., *Nature*, 429, 853, 2004).

To summarize, the major drawbacks of the current magnetocaloric materials are:
- the presence of a FOMT, inherent with a hysteresis loss and with an intense but sharp response but therefore a limited temperature of use,
- the presence of highly toxic material,
- a generally high production cost, due to the presence of expensive raw materials.

Accordingly, one of the subjects of the invention is to provide magnetic compounds, being in the form of an alloy, allowing a temperature of use greatly increased, presenting no hysteresis loss and having an almost constant response over the overall temperature use, i.e. near the room temperature, as a magnetocaloric agent, in particular for magnetic refrigeration.

Another subject of the invention is to provide compositions of magnetic compounds wherein the association of two magnetic compounds yield to a larger temperature span, allowing their uses in various refrigeration systems.

Another subject of the invention is to provide a process of preparation of magnetic compounds.

Thus, the present invention relates to the use of at least one compound having the following general formula (I) and a crystalline structure of $Ni_3Sn_2$ type:

$$Mn_{3-(x+x')}T_xT'_{x'}Sn_{2-(y+y')}X_yX'_{y'} \qquad (I)$$

in which:

T and T' are chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu, X and X' are chosen among: Ga, Ge, Sb, In, Al, Cd, As, P, C, Si, x, x', y and y' are comprised from 0 to 1, x+x'≦0.5, y+y'≦0.5, and x+x'+y+y'≦1, as a magnetocaloric agent, in particular for magnetic refrigeration.

The compounds of formula (I) used herein are in the form of alloys.

By "magnetocaloric agent", it is meant a compound able to exercise a magnetocaloric effect (MCE) such as defined above.

In the following of this specification, the different terms used, i.e. magnetic refrigerant, refrigerant material, magnetic material, magnetocaloric material, magnetocaloric agent, magnetocaloric compound have the same meaning and refer to a material adapted to the magnetic refrigeration.

When a material is magnetized in an applied magnetic field, the entropy associated with the magnetic degrees of freedom, the so-called magnetic entropy $S_m$, is changed as the field changes the magnetic order of the material. Under adiabatic conditions, $\Delta S_m$ must be compensated by an equal but opposite change of the entropy associated with the lattice, resulting in a change in temperature of the material.

This temperature change, $\Delta T_{ad}$ (or variation of the adiabatic temperature) is usually called "MCE" and reach maxima (or minima) at the transition temperature (i.e. the Curie temperature, the temperature where the material undergoes a change from a paramagnetic state to a ferromagnetic state).

Thus, the "transition temperature" or the phase transition or magnetic phase transition or phase change is the transformation of a thermodynamic system from one phase to another at a temperature change called Tc (also referred to peak herein) and at a maximum isothermal magnetic entropy change called $-\Delta S_M^{max}$.

In the present invention, it has been found that when the alloys have a crystalline structure of $Ni_3Sn_2$ type, i.e. orthorhombic Pnma, they exhibit at least two ferromagnetic transitions ($Tc_1$ and $Tc_2$), each of them being a second-order magnetic transition (SOMT), therefore leading to an almost constant magnetocaloric response over a larger temperature range of use (or a temperature span), near the room temperature, and presenting no hysteresis loss.

The temperature span depends on the location of the two second-order peaks ($Tc_1$ and $Tc_2$) and on the distance between said two peaks.

The occurrence of two magnetic entropy change maxima is not a common event, especially in the temperature range from 200K to 300K.

As already discussed above, giant magnetocaloric properties are generally connected to first-order magnetic transitions (FOMT) which yield an intense but sharp response by opposition with the broader and less intense peak produced by second-order magnetic transitions (SOMT).

In a second order phase transition, the change from one phase to another is continuous and there is no structural modification and no latent heat.

In addition, the kinetic is more rapid and the ageing problem leading to the presence of very brittle material and even broken in smaller grains, influencing its corrosion resistance and then the lifetime of the system, is circumvented.

Another advantage of the invention is the low cost and the great availability of the major constituents, i.e. Mn and Sn of the compounds.

Still another advantage of the invention consists in the opportunity to obtain variations of $Tc_1$ and $Tc_2$ in function of the chemical replacement of a part of Mn by T and T' and/or a part of Sn by X and X' and the respective proportion of T, T', X, X', leading thus to magnetocaloric materials adapted to various uses.

Thus, the invention relates to the use of at least one of the above defined compounds, said compound comprising at least two phase transitions, each of them being of second order and constituting a peak.

According to another preferred embodiment, the invention relates to the use of at least one of the above defined compounds having the following general formula (I) and a crystalline structure of $Ni_3Sn_2$ type:

$$Mn_{3-(x+x')}T_xT'_{x'}Sn_{2-(y+y')}X_yX'_{y'} \quad (I)$$

in which:

T and T' are chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu, X and X' are chosen among: Ga, Ge, Sb, In, Al, Cd, As, P, C, Si, x, x', y and y' are comprised from 0 to 1, and x, x', y and y' are all different from 0, x+x'≦0.5, y+y'≦0.5, and x+y≦1, as a magnetocaloric agent, in particular for magnetic refrigeration.

Therefore, the compounds of formula (I) are alloys comprising six element.

According to a more preferred embodiment, the invention relates to the use of at least one of the above defined compounds having the following general formula (II) and a crystalline structure of $Ni_3Sn_2$ type:

$$Mn_{3-(x+x')}T_xT'_{x'}Sn_{2-y}X_y \quad (II)$$

in which:

T and T' are chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu, X is chosen among: Ga, Ge, Sb, In, Al, Cd, As, P, C, Si, x, x', and y are comprised from 0 to 1, and x, x', y are all different from 0, x+x'≦0.5 and x+y≦1, as a magnetocaloric agent, in particular for magnetic refrigeration.

Therefore, the compounds of formula (II) are alloys comprising five elements.

According to another preferred embodiment, the invention relates to the use of at least one of the above defined compounds having the following general formula (III) and a crystalline structure of $Ni_3Sn_2$ type:

$$Mn_{3-x}T_xSn_{2-(y+y')}X_yX'_{y'} \quad (III)$$

in which:

T is chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu, X and X' are chosen among: Ga, Ge, Sb, In, Al, Cd, As, P, C, Si, x, y and y' are comprised from 0 to 1, x+x'≦0.5, y+y'≦0.5, and x+y≦1, and x, y, y' are all different from 0, as a magnetocaloric agent, in particular for magnetic refrigeration.

Therefore, the compounds of formula (III) are alloys comprising five elements.

According a preferred embodiment, the invention relates to the use of at least one of the above defined compounds having the following general formula (IV) and a crystalline structure of $Ni_3Sn_2$ type:

$$Mn_{3-x}T_xSn_{2-y}X_y \qquad (IV)$$

in which:
- T is chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
- X is chosen among: Ga, Ge, Sb, In, Al, Cd, As, P, C, Si,
- x and y are comprised from 0 to 1, $x+y \leq 1$,
- as a magnetocaloric agent, in particular for magnetic refrigeration.

Therefore, the compounds of formula (IV) are alloys comprising four, three or two elements, depending of the value of x and y.

According to another preferred embodiment, the invention relates to the use of at least one of the above defined compounds having the following general formula (IV) and a crystalline structure of $Ni_3Sn_2$ type:

$$Mn_{3-x}T_xSn_{2-y}X_y \qquad (IV)$$

in which:
- T is chosen among: Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
- X is chosen among: Ga, Ge, In, Al, Cd, C, Si,
- x and y are comprised from 0 to 1, $x+y \leq 1$; and x+y is different from 0,
- as a magnetocaloric agent, in particular for magnetic refrigeration.

Therefore, the compounds of formula (IV) are alloys comprising four or three elements, depending of the value of x and y.

According to a more preferred embodiment, the invention relates to the use of at least one of the above defined compounds having the following general formula (IV) and a crystalline structure of $Ni_3Sn_2$ type:

$$Mn_{3-x}T_xSn_{2-y}X_y \qquad (IV)$$

in which:
- T is chosen among: Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
- X is chosen among: Ge, In, Al, Cd, C, Si,
- x and y are comprised from 0 to 1 $x+y \leq 1$; and x+y is different from 0,
- as a magnetocaloric agent, in particular for magnetic refrigeration.

Therefore, the compounds of formula (IV) are alloys comprising four or three elements, depending of the value of x and y.

According to another preferred embodiment, the invention relates to the use of at least one of the above defined compounds having the following general formula (IV) and a crystalline structure of $Ni_3Sn_2$ type:

$$Mn_{3-x}T_xSn_{2-y}X_y \qquad (IV)$$

in which:
- T is chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
- X is chosen among: Ga, Ge, Sb, In, Al, Cd, As, P, C, Si,
- x and y are comprised from 0 to 1, x and y are different from 0, and $x+y \leq 1$,
- as a magnetocaloric agent, in particular for magnetic refrigeration.

Therefore, the compounds of formula (IV) are alloys comprising four elements.

According to another preferred embodiment, the invention relates to the use of at least one of the above defined compounds having the following general formula (V) and a crystalline structure of $Ni_3Sn_2$ type:

$$Mn_{3-x}T_xSn_2 \qquad (V)$$

in which:
- T is chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu, in particular Zr, Hf, Nb, Mo or a rare earth element selected from the group consisting in: La, Ce, Pr, Nd, Sm, Eu, Gd, Tb, Dy, Ho, Er, Tm, Yb, Sc, Y, Lu,
- x is comprised from 0 to 1 and x is different from 0,
- as a magnetocaloric agent, in particular for magnetic refrigeration.

Therefore, the compounds of formula (V) are alloys comprising three elements.

According to another preferred embodiment, the invention relates to the use of at least one of the above defined compounds having the following general formula (VI) and a crystalline structure of $Ni_3Sn_2$ type:

$$Mn_3Sn_{2-y}X_y \qquad (VI)$$

in which:
- X is chosen among: Ga, Ge, Sb, In, Al, Cd, As, P, C, Si, in particular Ga, Ge, In, Al, Cd, As, P, C, Si, and more particularly Ge, In, Al, Cd, As, P, C, Si,
- y is comprised from 0 to 1 and y is different from 0,
- as a magnetocaloric agent, in particular for magnetic refrigeration.

Therefore, the compounds of formula (VI) are alloys comprising three elements.

According to another preferred embodiment, the invention relates to the use of the above defined compound having the formula $Mn_3Sn_2$ and a crystalline structure of $Ni_3Sn_2$ type as a magnetocaloric agent, in particular for magnetic refrigeration.

The binary phase diagram $Mn_3Sn_2$ represented is represented in FIG. 2. Two phases are present near the composition of 40% Sn (Stange M. et al., *Journal of alloys and compounds*, 259(1-2), 140-144, 1997):
- the first one stoichiometric, $Mn_3Sn_2$, which is formed below 813 K
- the second one non stoichiometric, with more manganese, $Mn_{2-z}Sn$ (z~0.3), stable at a higher temperature (Satya M. et al., *Physics Letters*, 15(3), 225-227, 1965; Yasukochi K. et al., J. Phys. Soc. Jpn. 16, 1123-1130, 1961).

$Mn_3Sn_2$ has crystalline structure of $Ni_3Sn_2$ type, i.e. an orthorhombic Pnma structural type. The orthorhombic structure of $Mn_3Sn_2$ is represented in FIG. 3.

$Mn_{2-z}Sn$ is a compact hexagonal stack of Sn atoms in which octahedral sites and a part of bipyramidal sites are occupied by manganese atoms. This structure is intermediate between NiAs a $Ni_2In$ in which bipyramidal sites are respectively empty or full (FIG. 4).

When this mixture is annealed at T<500° C., only $Mn_3Sn_2$ is present and can be used as a magnetocaloric agent, in particular for magnetic refrigeration.

According to another preferred embodiment, the invention relates to the use of at least one of the above defined compounds wherein the cooling capacity q for a magnetic field applied from more than 0 to about 5 T is comprised from about 50 mJ/cm$^3$ to about 5000 mJ/cm$^3$ particularly from about 100 mJ/cm$^3$ to about 4000 mJ/cm$^3$, more particularly from about 500 mJ/cm$^3$ to about 3000 mJ/cm$^3$ and more particularly from about 1000 mJ/cm$^3$ to about 2000 mJ/cm$^3$.

The refrigerant capacity (RC) of a magnetic refrigerant, that is the amount of heat which can be transferred in one thermodynamic cycle (Gschneidner K. A. et al., *Annu. Rev. Mater. Sci.*, 30, 387, 2000; Tishin A. M., et al., *The magnetocaloric effect and its applications*, (Institute of physics Publishing, Bristol, 2003; Gschneidner K. A. et al., *Tsokol, Rep. Prog., Phys.* 68, 1479, 2005; Wood M. E. et al., *Cryogenics*, 25, 667, 2001) can be calculated with three different methods:

1) first method: the numerical integration of the area under the $-\Delta S_m(T)$ curve between $T_1$ and $T_2$ leads to the cooling capacity $q=-\int_{T_1}^{T_2} \Delta S_M(T)dT$ (Gschneidner K. A. et al., *Annu. Rev. Mater. Sci.*, 30, 387, 2000; Gschneidner K. A. et al., *Tsokol, Rep. Prog., Phys.* 68, 1479, 2005), 2) second method: for a conventional 'caret-like' MCE behavior, the relative cooling power (RCP) is given by the product of the maximum $-\Delta S_m$ and full width at half maximum $\delta T_{FWHM}$:
RCP=$-\Delta S_M^{max} \times \delta T_{FWHM}$. The RCP is approximately 4/3 times larger than the cooling capacity q for the same temperature interval (Gschneidner K. A. et al., *Annu. Rev. Mater. Sci.*, 30, 387, 2000), 3) third method: it is described by Wood and Potter (Wood M. E. et al., *Cryogenics*, 25, 667, 2001). The refrigerant capacity is defined for a reversible cycle between $T_{hot}$ and $T_{cold}$ as RC=$-\Delta S_m \Delta T_{cycl}$ where $-\Delta S_m$ is the magnetic entropy change at the hot and cold ends of the cycle, which must be equal, and $\Delta T_{cycl}=T_{hot}-\Delta T_{cold}$. The maximum refrigerant capacity (MRC) is reached when $-\Delta S_m \Delta T_{cycl}$ is maximized, thus defining the hot and cold temperatures for which the material is the most effective (FIG. 1).

However, the refrigerant capacity (RC) which also takes into account the width and shape of $\Delta S_M$ vs T curves, is a more relevant parameter when evaluating the technological interest of a refrigerant material.

Based on this criterion, the gap between FOMT and SOMT materials becomes less impressive.

The refrigerant capacity of the above defined compounds has been determined by the above described method 1) and corresponds therefore to the cooling capacity q.

FIG. 5 represents the results obtained with the three methods for $Mn_3Sn_2$ and others magnetic refrigerants like Gd, $Gd_5Si_2Ge_2$.

As can be seen in FIGS. 5(b) and (c), both methods lead to RC values for $Mn_3Sn_2$ reaching at least ~40 to 50% that of the best refrigerants working near room temperature. However, most of them involve FOMT with the possible detrimental effects for fast-cycling refrigerators of hysteresis losses and slow kinetics. Further, by opposition with $Mn_3Sn_2$, these compounds are made from high-cost (Gd, Ge) or toxic (As, P, Sb).

According to another preferred embodiment, the invention relates to the use of at least one of the above defined compounds wherein the variation of the magnetic entropy ($-\Delta S_M$) versus the temperature for a magnetic field applied from more than 0 to about 5 T is comprised from about 5 mJ/cm$^3$/K to about 100 mJ/cm$^3$/K particularly between 10 mJ/cm$^3$/K to about 50 mJ/cm$^3$/K, more particularly from about 15 mJ/cm$^3$/K to about 40 mJ/cm$^3$/K and more particularly from about 20 mJ/cm$^3$/K to about 30 mJ/cm$^3$/K.

According to another preferred embodiment, the invention relates to the use of at least one of the above defined compounds wherein the variation of the adiabatic temperature ($\Delta T_{ad}$) for a magnetic field applied from more than 0 to about 5T is comprised from about 0.5 K to about 10 K, particularly from about 1 K to about 5 K and more particularly from about 1.5 K to about 3K.

According to another preferred embodiment, the invention relates to the use of at least one of the above defined compounds comprising two peaks which are in a temperature range from about 50 K to about 550 K, particularly from about 100 K to about 400 K, more particularly from about 150 K to about 350 K and more particularly from about 200 K to about 300 K.

Therefore, one of the advantages of the Invention is to provide compounds having a temperature span broadened due to the presence of two transitions peaks.

FIG. 6 represent the variation of entropy versus the temperature of $Mn_3Sn_2$ (upper slide) and $Gd_5Si_2Ge_2$ (U.S. Pat. No. 6,589,366, lower slide). The temperature span of $Mn_3Sn_2$ is broadened by comparison with compounds with a giant effect like $Gd_5Si_2Ge_2$ (and the other FOMT) which extends no more than ±25 K from Tc.

According to another preferred embodiment, the invention relates to the use of at least one compound wherein the temperature range between at least two adjacent peaks and particularly between all the adjacent peaks is comprised from about 50 K to about 100 K.

In order to obtain a constant magnetocaloric response, the difference of temperature ($Tc_1-Tc_2$) between two adjacent peaks must be comprised from about 50K to about 100K. When the difference of temperature is lower than 50K, it does not provide a temperature of use sufficient to be adapted to various refrigerant systems. If the gap is more than 100K, the compound becomes uninteresting because the response is no more constant.

According to another aspect, the invention relates to a composition having the following general formula (VII):

$$(A, B) \qquad (VII)$$

in which:

A is at least one the above defined compounds,

B is at least a second magnetocaloric material having a transition peak comprised from about 290 to about 340 K chosen from the group consisting of Gd, $MgMn_6Sn_6$, $Mn_4Ga_2Sn$, $Gd_5Si_{4-z}Ge_z$, $Gd_5(Si_{1-z}Ge_z)_4$, $MnFeP_{1-z}As_z$, z being comprised from 0 to 1, as a magnetocaloric agent, in particular for magnetic refrigeration.

A composition can be made consisting in a mixture of at least one compound A and a material B, in order to still broaden the temperature span of the compounds A defined above. B can be any identified material already known presenting at least a transition peak in the temperature range 290-340K, and particularly Gd, $MgMn_6Sn_6$, $Mn_4Ga_2Sn$, $Gd_5Si_2Ge_2$, MnFePAs;

In the composition, A is working in the low temperature range (200K-290K) and B is working in the high temperature range (290K-340K).

The B material can be a FOMT or SOMT material.

The composition can be made with a mixture of the powders of compound A and material B or a multi layer mixture of each constituent.

According to a preferred embodiment, the invention relates to one of the above defined compositions wherein the ratio (w/w) between A and B is from about 0.01 to about 99, particularly from about 0.1 to about 10 and more particularly from about 0.5 to about 5.

FIG. 7 represent the thermal variation of the magnetic entropy versus temperature of a mixture of $Mn_3Sn_2$ and $MgMn_6Sn_6$ (ratio=1, w/w) at different magnetic fields applied.

In comparison with $Mn_3Sn_2$ (FIG. 1) and $MgMn_6Sn_6$ (FIG. 8) alone, the variation of the magnetic entropy versus the temperature of said mixture is associated with three peaks ($T_{C1}$=227 K and $T_{C2}$=262K for $Mn_3Sn_2$ and a peak at 290 K due to $MgMn_6Sn_6$).

The intensity of the magnetic entropy is proportional to the quantity of each compound. Therefore, the ratio of $Mn_3Sn_2$ and $MgMn_6Sn_6$ being 50/50 (w/w), the $-\Delta S_M$ value of the three peaks has been lowered by a factor 2 (approximately 17 and 14 for $Tc_1$ and $Tc_2$ respectively instead of approximately 30 mJ/cm$^3$/K ($Tc_1$ and $Tc_2$) for $Mn_3Sn_2$ and 23 mJ/cm3/K for $MgMn_6Sn_6$), in comparison with $Mn_3Sn_2$ and $MgMn_6Sn_6$ taken alone, but the temperature range is broadened from 200 to 320K.

Therefore, depending on the compounds and materials introduced as well as their respective ratio, it is possible to modulate the magnetic entropy and the temperature span, allowing thus to adapt the composition to the desired refrigeration system.

According to another preferred embodiment, the invention relates to the use of one of the above defined compositions wherein the cooling capacity q for a magnetic field applied from about 0 to about 5 T is comprised from about 50 mJ/cm$^3$ to about 5000 mJ/cm$^3$ particularly from about 100 mJ/cm$^3$ to about 4000 mJ/cm$^3$, more particularly from about 500 mJ/cm$^3$ to about 3500 mJ/cm$^3$ and more particularly from about 1000 mJ/cm$^3$ to about 3000 mJ/cm$^3$.

According to another preferred embodiment, the invention relates to the use of one of the above defined compositions wherein said peaks are in a temperature range from about 50 K to about 600 K, particularly from about 100 K to about 500 K, more particularly from about 150 K to about 400 K and more particularly from about 200 K to about 350 K.

One of the advantages of the compositions of the invention is to broaden the temperature of use of said compositions in comparison to the existing materials B or the compounds A defined above taken alone, while lowering the cost of the composition thanks to the lower quantity of material B introduced.

According to a more preferred embodiment, the invention relates to the use of at least one of the above defined compositions wherein the temperature range between at least two adjacent peaks and particularly between all the adjacent peaks is comprised from about 50 K to about 100 K.

In order to obtain a constant magnetocaloric response on a broadened temperature span, the difference of temperature between two adjacent peaks must be comprised from about 50K to about 100K.

According to another aspect, the invention relates to a magnetocaloric material having the following general formula (I) and a crystalline structure of $Ni_3Sn_2$ type:

$$Mn_{3-(x+x')}T_xT'_{x'}Sn_{2-(y+y')}X_yX'_{y'} \qquad (I)$$

in which:
T and T' are chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
X and X' are chosen among: Ga, Ge, Sb, In, Al, Cd, As, P, C, Si,
x, x', y and y' are comprised from 0 to 1,
x+x'≦0.5, y+y'≦0.5, and x+x'+y+y'≦1,
provided that x+x'+y+y' are different from 0.

According to another preferred embodiment, the invention relates to one of the above defined magnetocaloric materials having the following general formula (I):

$$Mn_{3-(x+x')}T_xT'_{x'}Sn_{2-(y+y')}X_yX'_{y'} \qquad (I)$$

in which:
T and T' are chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
X and X' are chosen among: Ga, Ge, Sb, In, Al, Cd, As, P, C, Si,
x, x', y and y' are comprised from 0 to 1,
x+x'≦0.5, y+y'≦0.5, x+x'+y+y'≦1, and x, x', y and y' are all different from 0.

Therefore, the compounds of formula (I) are alloys comprising six elements.

According to another preferred embodiment, the invention relates to one of the above defined magnetocaloric materials having he following general structure (II):

$$Mn_{3-(x+x')}T_xT'_{x'}Sn_{2-y}X_y \qquad (II)$$

in which:
T and T' are chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
X is chosen among: Ga, Ge, Sb, In, Al, Cd, As, P, C, Si,
x, x', and y are comprised from 0 to 1,
x+x'≦0.5, x+y≦1, and x, x', y are all different from 0.

Therefore, the compounds of formula (II) are alloys comprising five elements.

According to another preferred embodiment, the invention relates to one of the above defined magnetocaloric materials having he following general structure (III):

$$Mn_{3-x}T_xSn_{2-(y+y')}X_yX'_{y'} \qquad (III)$$

in which:
T is chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
X and X' are chosen among: Ga, Ge, Sb, In, Al, Cd, As, P, C, Si,
x, y and y' are comprised from 0 to 1,
x+x'≦0.5, y+y'≦0.5, x+y≦1, and x, y ,y' are all different from 0.

Therefore, the compounds of formula (III) are alloys comprising five elements.

According to another preferred embodiment, the invention relates to one of the above defined magnetocaloric materials having the following general formula (IV) and a crystalline structure of $Ni_3Sn_2$ type:

$$Mn_{3-x}T_xSn_{2-y}X_y \qquad (IV)$$

in which:
T is chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
X is chosen among: Ga, Ge, Sb, In, Al, Cd, As, P, C, Si,
x and y are comprised from 0 to 1, x+y≦1,
Therefore, the compounds of formula (IV) are alloys comprising four, three or two elements.

According to another preferred embodiment, the invention relates to one of the above defined magnetocaloric materials having the following general formula (IV):

$$Mn_{3-x}T_xSn_{2-y}X_y \quad (IV)$$

in which:
T is chosen among: Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
X is chosen among: Ga, Ge, In, Al, Cd, C, Si,
x and y are comprised from 0 to 1, x+y≦1; provided that x+y is different from 0.

Therefore, the compounds of formula (IV) are alloys comprising four or three elements.

According to another preferred embodiment, the invention relates to one of the above defined magnetocaloric materials having the following general formula (IV):

$$Mn_{3-x}T_xSn_{2-y}X_y \quad (IV)$$

in which:
T is chosen among: Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
X is chosen among: Ge, In, Al, Cd, C, Si,
x and y are comprised from 0 to 1 x+y≦1; provided that x+y is different from 0.

Therefore, the compounds of formula (IV) are alloys comprising four or three elements.

According to another preferred embodiment, the invention relates to one of the above defined magnetocaloric materials having the following general formula (IV):

$$Mn_{3-x}T_xSn_{2-y}X_y \quad (IV)$$

in which:
T is chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
X is chosen among: Ga, Ge, Sb, In, Al, Cd, As, P, C, Si,
x and y are comprised from 0 to 1, x and y are different from 0, and x+y≦1.

Therefore, the compounds of formula (IV) are alloys comprising four elements.

According to another preferred embodiment, the invention relates to one of the above defined magnetocaloric materials having the following general formula (V):

$$Mn_{3-x}T_xSn_2 \quad (V)$$

in which:
T is chosen among: Ti, V, Cr, Fe, Co, Ni, Cu, Zn, Ru, or a rare earth element selected from the group consisting in: La, Ce, Pr, Nd, Sm, Eu, Gd, Tb, Dy, Ho, Er, Tm, Yb, Sc, Y, Lu, in particular Zr, Hf, Nb, or a rare earth element selected from the group consisting in: La, Ce, Pr, Nd, Sm, Eu, Gd, Tb, Dy, Ho, Er, Tm, Yb, Sc, Y, Lu, Therefore, the compounds of formula (V) are alloys comprising three elements.

According to another preferred embodiment, the invention relates to one of the above defined magnetocaloric materials having the following general formula (VI) and a crystalline structure of $Ni_3Sn_2$ type:

$$Mn_3Sn_{2-y}X_y \quad (VI)$$

in which:
X is chosen among: Ga, Ge, Sb, In, Al, Cd, As, P, C, Si, in particular Ga, Ge, In, Al, Cd, As, P, C, Si, and more particularly Ge, In, Al, Cd, As, P, C, Si,
y is comprised from 0 to 1 and y is different from 0.

Therefore, the compounds of formula (VI) are alloys comprising three elements.

According to another preferred embodiment, the invention relates to one of the above defined magnetocaloric materials wherein the phase transition of said magnetocaloric material comprising at least two phase transitions, each of them being of second order and constituting a peak.

According to another preferred embodiment, the invention relates to one of the above defined magnetocaloric materials wherein the cooling capacity for a magnetic field applied from 0 to about 5 T is comprised from about 50 mJ/cm³ to about 5000 mJ/cm³ particularly from about 100 mJ/cm³ to about 4000 mJ/cm³, more particularly from about 500 mJ/cm³ to about 3000 mJ/cm³ and more particularly from about 1000 mJ/cm³ to about 2000 mJ/cm³.

According to another preferred embodiment, the invention relates to one of the above magnetocaloric materials wherein the variation of the magnetic entropy ($-\Delta S_M$) versus the temperature for a magnetic field applied from more than 0 to about 5 T is comprised from about 5 mJ/cm³/K to about 50 mJ/cm³/K particularly between 10 mJ/cm³/K to about 40 mJ/cm³/K, more particularly from about 15 mJ/cm³/K to about 35 mJ/cm³/K and more particularly from about 20 mJ/cm³/K to about 30 mJ/cm³/K.

According to another preferred embodiment, the invention relates to one of the above above defined magnetocaloric material wherein the variation of the adiabatic temperature ($\Delta T_{ad}$) for a magnetic field applied from 0 to about 5 T is comprised from about 0.5 K to about 5 K, particularly from about 1 K to about 4 K and more particularly from about 1.5 K to about 3 K.

According to another preferred embodiment, the invention relates to one of the above magnetocaloric materials wherein said two peaks are in a temperature range from about 50 K to about 550 K, particularly from about 100 K to about 400 K, more particularly from about 150 K to about 350 K and more particularly from about 200 K to about 300 K.

According to another preferred embodiment, the invention relates to one of the above magnetocaloric materials wherein the temperature range between at least two adjacent peaks and particularly between all the adjacent peaks is comprised from about 50 K to about 100 K.

According to another preferred embodiment, the invention relates to one of the above magnetocaloric material chosen from the group consisting of:
$Mn_{3-x}Fe_xSn_{2-y}Ga_y$, wherein 0≦x≦0.5 and 0≦y≦0.5,
$Mn_{3-x}Fe_xSn_{2-y}Ge_y$, wherein 0≦x≦0.5 and 0≦y≦0.5,
$Mn_{3-x}Fe_xSn_{2-y}In_y$, wherein 0≦x≦0.5 and 0≦y≦0.5,
$Mn_{3-x}Fe_xSn_{2-y}Sb_y$, wherein 0≦x≦0.5 and 0≦y≦0.5,
$Mn_{3-x}Co_xSn_{2-y}Ga_y$, wherein 0≦x≦0.5 and 0≦y≦0.5,
$Mn_{3-x}Co_xSn_{2-y}Ge_y$, wherein 0≦x≦0.5 and 0≦y≦0.5,
$Mn_{3-x}Co_xSn_{2-y}In_y$, wherein 0≦x≦0.5 and 0≦y≦0.5,
$Mn_{3-x}Cr_xSn_{2-y}In_y$, wherein 0≦x≦0.5 and 0≦y≦0.5,
$Mn_{3-x}Co_xSn_{2-y}Sb_y$, wherein 0≦x≦0.5 and 0≦y≦0.5,
$Mn_{3-x}Ni_xSn_{2-y}Ga_y$, wherein 0≦x≦0.5 and 0≦y≦0.5,
$Mn_{3-x}Ni_xSn_{2-y}Ge_y$, wherein 0≦x≦0.5 and 0≦y≦0.5,
$Mn_{3-x}Ni_xSn_{2-y}In_y$, wherein 0≦x≦0.5 and 0≦y≦0.5,
$Mn_{3-x}Ni_xSn_{2-y}Sb_y$, wherein 0≦x≦0.5 and 0≦y≦0.5,
$Mn_{3-x}Nb_xSn_{2-y}Ga_y$, wherein 0≦x≦0.5 and 0≦y≦0.5,
$Mn_{3-x}Nb_xSn_{2-y}Ge_y$, wherein 0≦x≦0.5 and 0≦y≦0.5,
$Mn_{3-x}Nb_xSn_{2-y}In_y$, wherein 0≦x≦0.5 and 0≦y≦0.5,
$Mn_{3-x}Nb_xSn_{2-y}Sb_y$, wherein 0≦x≦0.5 and 0≦y≦0.5,
$Mn_{3-x}Zn_xSn_{2-y}Ga_y$, wherein 0≦x≦0.5 and 0≦y≦0.5,
$Mn_{3-x}Zn_xSn_{2-y}Ge_y$, wherein 0≦x≦0.5 and 0≦y≦0.5,
$Mn_{3-x}Zn_xSn_{2-y}In_y$, wherein 0≦x≦0.5 and 0≦y≦0.5,
$Mn_{3-x}Zn_xSn_{2-y}Sb_y$, wherein 0≦x≦0.5 and 0≦y≦0.5.

$Mn_{3-x}Fe_xSn_{2-(y+y')}As_yP_{y'}$ wherein $0 \leq x \leq 0.5$ and $0 \leq y \leq 0.5$, and $0 \leq y' \leq 0.5$, According to another preferred embodiment, the invention relates to one of the above magnetocaloric materials chosen from the group consisting of:

$Mn_{3-x}Fe_xSn_2$ where $0 \leq x \leq 0.5$,
$Mn_{3-x}Cu_xSn_2$ where $0 \leq x \leq 0.1$,
$Mn_{3-x}Co_xSn_2$ where $0 \leq x \leq 0.5$,
$Mn_{3-x}Ni_xSn_2$ where $0 \leq x \leq 0.5$,
$Mn_3Sn_{2-y}Ga_y$ where $0 \leq y \leq 0.1$,
$Mn_3Sn_{2-y}Ge_y$ where $0 \leq y \leq 0.5$,
$Mn_{3-x}Nb_xSn_2$ where $0 \leq x \leq 0.5$,
$Mn_{3-x}Y_xSn_2$ where $0 \leq x \leq 0.5$.
$Mn_{3-x}Co_xSn_{2-y}In_y$ wherein $0 \leq x \leq 0.5$ and $0 \leq y \leq 0.5$,
$Mn_{3-x}Cr_xSn_{2-y}In_y$ wherein $0 \leq x \leq 0.5$ and $0 \leq y \leq 0.5$,
$Mn_{3-x}Fe_xSn_{2-(y+y')}As_yP_{y'}$ wherein $0 \leq x \leq 0.5$ and $0 \leq y \leq 0.5$, and $0 \leq y' \leq 0.5$, The replacement of a part of Sn by Ga from $0 \leq y \leq 0.1$ leads to compounds which modulate the temperature of use from the cold temperature to the hot temperature by increasing the Ga ratio (FIG. 9).

The replacement of a part of Mn by Fe leads in the same way to compounds, the temperature span and variation of entropy of which can be modulated (Table I and FIG. 10-13).

The replacement of a part of Mn by Co or Cr and of a part of Sn by In (compounds with four elements) or the replacement of a part of Mn by Fe and of a part of Sn by As and P (compounds with five elements) leads also to compounds, the temperature span and variation of entropy of which can be modulated (FIG. 14-16)

TABLE I

| Compound | $Tc_1$ (K) | $Tc_2$ (K) | $\Delta S_{M1}$ at 5T (mJ · cm$^{-3}$ · K$^{-1}$) | $\Delta S_{M2}$ at 5T (mJ · cm$^{-3}$ · K$^{-1}$) | q (mJ · cm$^{-3}$) |
|---|---|---|---|---|---|
| $Mn_3Sn_2$ | 262 | 227 | 27.2 | 26.4 | 1866 |
| $Mn_{2.9}Cu_{0.1}Sn_2$ | 243 | 212 | 23.1 | 23.8 | 1685 |
| $Mn_{2.9}Fe_{0.1}Sn_2$ | 261 | 228 | 26.2 | 24.4 | 1768 |
| $Mn_{2.8}Fe_{0.2}Sn_2$ | 261 | 228 | 25.2 | 21.6 | 1754 |
| $Mn_{2.5}Fe_{0.5}Sn_2$ | 258 | 202 | 24.8 | 14.9 | 1572 |

As shown on various figures the numerous possible chemical substitutions on both the Mn and Sn sublattices allow to vary the transition temperatures ($TC_1$ and $TC_2$) as well as the magnitude of corresponding magnetocaloric effect. Consequently, the chemical substitutions allow to tune the temperature span, working temperatures and shape of the magnetocaloric response. It is thus possible to design this shape to that required by the employed refrigeration cycle.

According to another aspect, the invention relates to a magnetocaloric composition having the following general formula (VII):

$$(A, B) \quad (VII)$$

in which:

A is at least one of the above defined compounds,
B is at least a second magnetocaloric material having a transition peak comprised from about 290 to about 340 K chosen from the group consisting of Gd, $MgMn_6Sn_6$, $Mn_4Ga_2Sn$, $Gd_5Si_{4-z}Ge_z$, $Gd_5(Si_{1-z}Ge_z)_4$, $MnFeP_{1-z}As_z$,
z is comprised from 0 to 1.

According to a preferred embodiment, the invention relates to the use of a magnetocaloric composition wherein the ratio (w/w) between A and B is from about 0.01 to about 99, particularly from about 0.1 to about 10, and more particularly from about 0.5 to about 5.

According to a preferred embodiment, the invention relates to the use of one of the above defined magnetocaloric composition chosen from the group consisting of:

$Mn_3Sn_2$ and Gd, $Mn_3Sn_2$ and $MgMn_6Sn_6$, $Mn_3Sn_2$ and $Mn_4Ga_2Sn$, $Mn_3Sn_2$ and $Gd_5Si_{4-z}Ge_z$, $Gd_5(Si_{1-z}Ge_z)_4$, $Mn_3Sn_2$ and $MnFeP_{1-z}As_z$,
$Mn_{3-x}Fe_xSn_2$ and Gd, $Mn_{3-x}Fe_xSn_2$ and $MgMn_6Sn_6$, $Mn_{3-x}Fe_xSn_2$ and $Mn_4Ga_2Sn$,
$Mn_{3-x}Fe_xSn_2$ and $Gd_5Si_{4-z}Ge_z$, $Mn_{3-x}Fe_xSn_2$ and $Gd_5(Si_{1-z}Ge_z)_4$, $Mn_3Sn_2$ and $MnFeP_{1-z}As_z$, x being as above defined above.

The invention also relates to a process of preparation of the compound of formula (I) having a crystalline structure of $Ni_3Sn_2$ type $$Mn_{3-(x+x')}T_xT'_{x'}Sn_{2-(y+y')}X_yX'_{y'} \quad (I)$$

in which:
T and T' are chosen among: Ti, V, Cr, Fe, Co, Ni, Cu, Zn, Ru, Zr, Hf, Nb, Mo, or a rare earth element selected from the group consisting in: La, Ce, Pr, Nd, Sm, Eu, Gd, Tb, Dy, Ho, Er, Tm, Yb, Sc, Y, Lu,
X and X' are chosen among: Ga, Ge, Sb, In, Al, Cd, As, P, C, Si,
x, x', y and y' are comprised from 0 to 1,
$x+x' \leq 0.5$, $y+y' \leq 0.5$, and $x+x'+y+y' \leq 1$,
comprising at least a step of annealing, at a temperature below 480° C., preferably from about 450° C. to about 480° C., a homogenized mixture prepared by sintering a mixture of the elements Mn, T, T', Sn, X and X', in an appropriate amount, T, T', X and X' being as above defined, in particular pure elements, at a temperature range from 300 to 600° C.

The sintering step is carried out to combine and homogenize the mixture of the elements.

During the step of annealing, the treatment of this homogenised mixture, at a temperature below 480° C., leads to a unique compound $Mn_3Sn_2$ having a $Ni_3Sn_2$ structure type.

According to a another embodiment the invention relates to a process of preparation of the compound of formula (I) having a crystalline structure of $Ni_3Sn_2$ type $$Mn_{3-(x+x')}T_xT'_{x'}Sn_{2-(y+y')}X_yX'_{y'} \quad (I)$$

in which:
T and T' are chosen among: Ti, V, Cr, Fe, Co, Ni, Cu, Zn, Ru, or a rare earth element selected from the group consisting in: La, Ce, Pr, Nd, Sm, Eu, Gd, Tb, Dy, Ho, Er, Tm, Yb, Sc, Y, Lu,
X and X' are chosen among: Ga, Ge, Sb, In, Al, Cd, As, P, C, Si,
x, x', y and y' are comprised from 0 to 1,
$x+x' \leq 0.5$, $y+y' \leq 0.5$, and $x+x'+y+y' \leq 1$,
comprising one step of annealing, at a temperature below 480° C., preferably from about 450° C. to about 480° C., a homogenized mixture prepared by sintering a mixture of the elements Mn, T, T', Sn, X and X', in an appropriate amount, T, T', X and X' being as above defined, in particular pure elements, at a temperature range from 300 to 600° C.

According to a preferred embodiment, the invention relates to a process of preparation to obtain a compound of formula (I) in which:

T and T' are chosen among: Zr, Hf, Nb, Mo,
X and X' are chosen among: Ga, Ge, Sb, In, Al, Cd, As, P, C, Si,
x and y are comprised from 0 to 1 and $x+y \leq 1$;
comprising a first step of annealing a homogenized mixture of the elements Mn, T, T', Sn, X and X', in an appropriate amount, at a temperature from about 550° C. to about 850° C., particularly at a temperature from about 600° C. to about 800° C. and more particularly from 650° C. to about 750° C., and a second step of annealing at a temperature below 480° C., preferably from about 450° C. to about 480° C., said homogenised mixture being prepared by sintering a mixture of the elements Mn, T, T', Sn, X and X', in an appropriate amount, T, T', X and X' being as above defined, in particular pure elements, at a temperature range from 300 to 600° C.

When T and T' are chosen among Zr, Hf, Nb, the temperature of annealing below 480° C. described above is not sufficient to obtain an alloy and therefore must be increased. The second step below 480° C., as described above leads to a $Ni_3Sn_2$ structure type.

According to a preferred embodiment, the invention relates to a process of preparation wherein said homogenized mixture prepared by sintering a mixture of the elements Mn, T, T', Sn, X, X', is first ground to obtain an amorphous or microcrystalline mixture.

The grinding is realised to obtain a homogenized powder in the form of an amorphous or micro-crystalline mixture.

According to a preferred embodiment, the invention relates to a process of preparation to obtain a compound of formula (I) in which:

T and T' are chosen among: Ti, V, Cr, Fe, Co, Ni, Cu, Zn, Ru, or a rare earth element selected from the group consisting in: La, Ce, Pr, Nd, Sm, Eu, Gd, Tb, Dy, Ho, Er, Tm, Yb, Sc, Y, Lu,
X and X' chosen among: Ga, Ge, Sb, In, Al, Cd, As, P, C, Si,
x and y are comprised from 0 to 1 and $x+y \leq 1$;
comprising:
a) optionally grinding a mixture of the elements Mn, T, T', Sn, X and X', in an appropriate amount to obtain an amorphous or micro-crystalline mixture,
b) sintering said amorphous or micro-crystalline mixture at a temperature comprised from 300 to 600° C. to obtain a homogenized mixture,
c) crushing and compacting said homogenized mixture to obtain a crushed and compacted mixture,
d) annealing said crushed and compacted mixture at a temperature below 480° C., preferably from about 450° C. to about 480° C.

According to a preferred embodiment, the invention relates to a process of preparation to obtain a compound of formula (I) in which:

T and T' are chosen among: Zr, Hf, Nb, Mo,
X and X' chosen among: Ga, Ge, Sb, In, Al, Cd, As, P, C, Si,
x and y are comprised from 0 to 1 and $x+y \leq 1$;
comprising:
a) optionally grinding a mixture of the elements Mn, T, T', Sn, X and X', in an appropriate amount to obtain an amorphous or micro-crystalline mixture,
b) sintering said amorphous or micro-crystalline mixture at a temperature comprised from 300 to 600° C. to obtain a homogenized mixture,
c) crushing and compacting said homogenized mixture to obtain a crushed and compacted mixture,
d) annealing said crushed and compacted mixture in a first step at a temperature comprised from 650° C. to 750° C., grinding the mixture thus obtained and annealing in a second step at a temperature below 480° C., preferably from about 450° C. to about 480° C.

The above defined compounds can be used for magnetic refrigeration in systems such as near room temperature magnetic refrigerators (FIGS. 17 and 18), freezers, conditioned air, gas liquefaction, cooling of electronic components, heat pump (FIG. 17).

EXAMPLES

Figure 1:
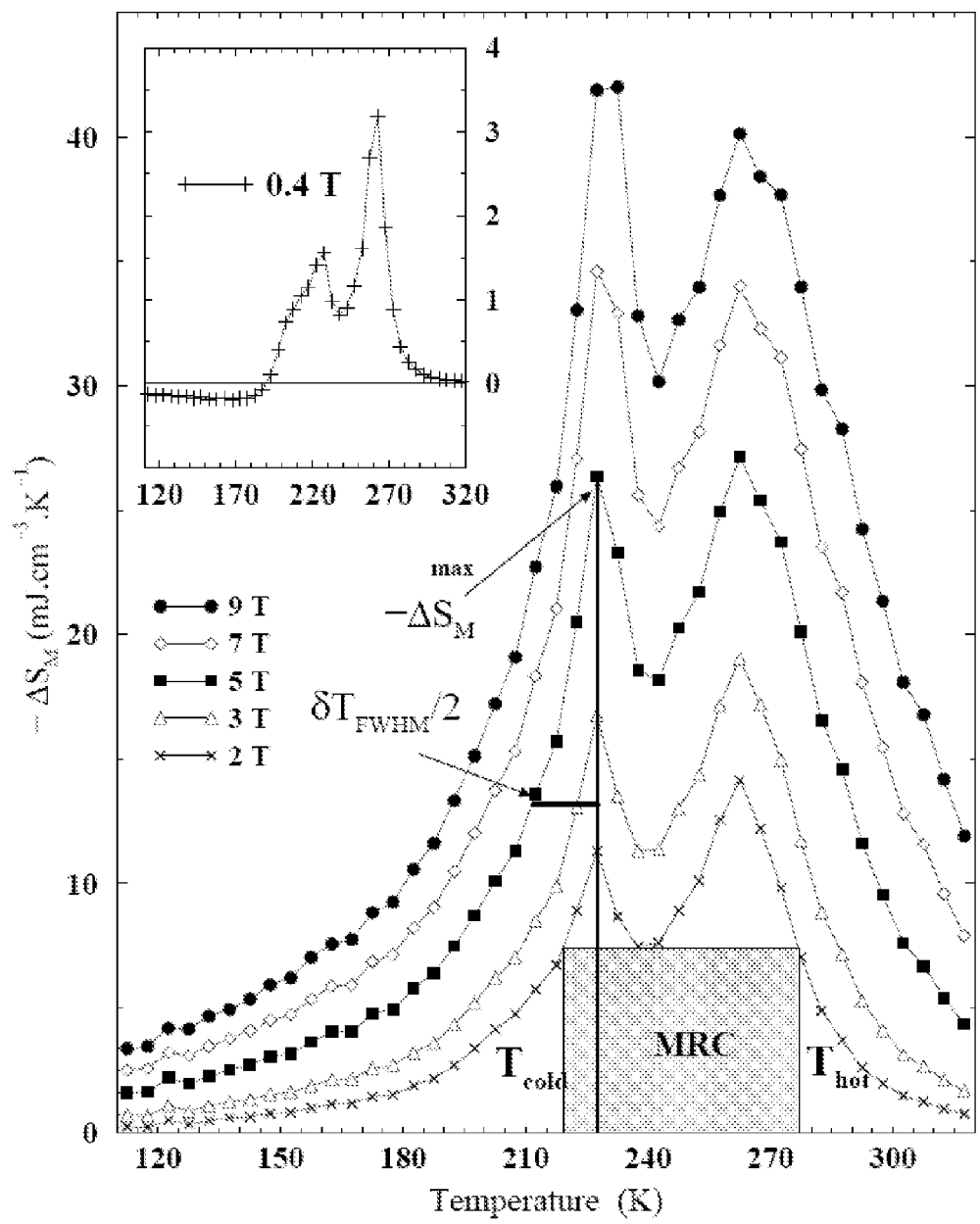
FIG. 1 represents the thermal variation of the magnetic entropy versus temperature of $Mn_3Sn_2$. On this figure are also indicated $-\Delta S_M^{max}$, $\delta T_{FWHM}/2$, $T_{cold}$, $T_{hot}$ and MRC as defined in the specification.
Figure 2:
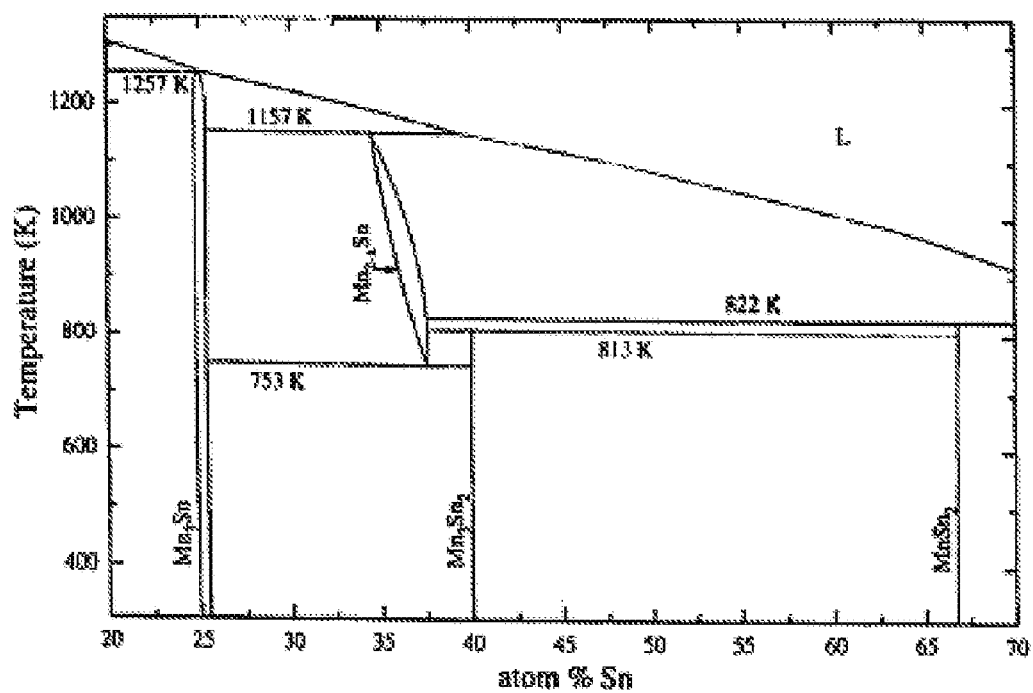
FIG. 2 represents the binary phase diagram of Mn and Sn (Stange M. et al., *Journal of alloys and compounds*, 259(1-2), 140-144, 1997).
Figure 3:
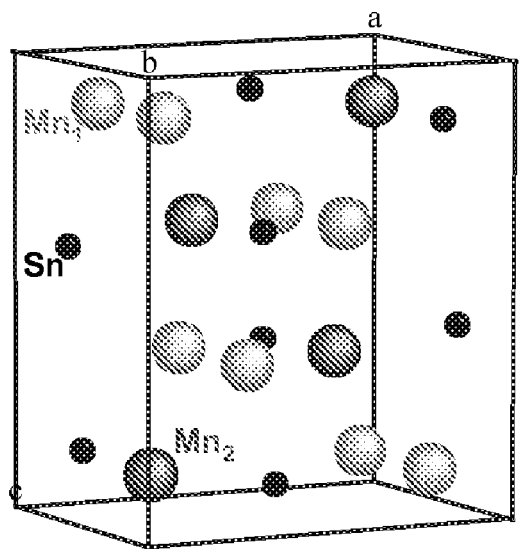
FIG. 3 represents the orthorhombic structure of $Mn_3Sn_2$ showing the $Ni_3Sn_2$ structural type (Pnma) adopted (upper slide (A)) and the crystal parameters of the $Ni_3Sn2$-type (Pnma) $Mn_3Sn_2$ compound (lower slide (B)).
Figure 4:
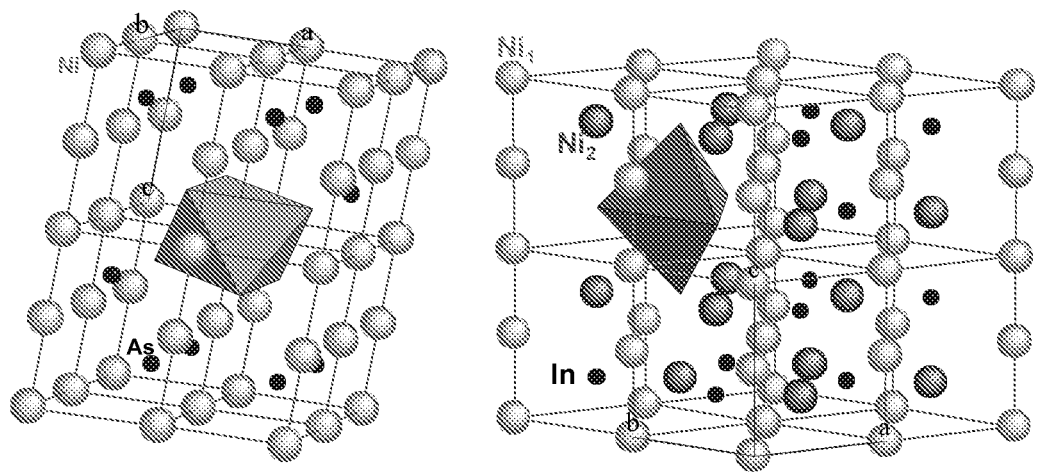
FIG. 4 represent the NiAs type of structure ($P6_3/mmc$), the $Ni_2In$ type of structure ($P6_3/mmc$) (left (A) and right (B) upper slide respectively) and the crystal parameters of the lacunary $Ni_2In$-type ($P6_3/mmc$) $Mn_{2-x}Sn$ compounds (C).
Figure 5:
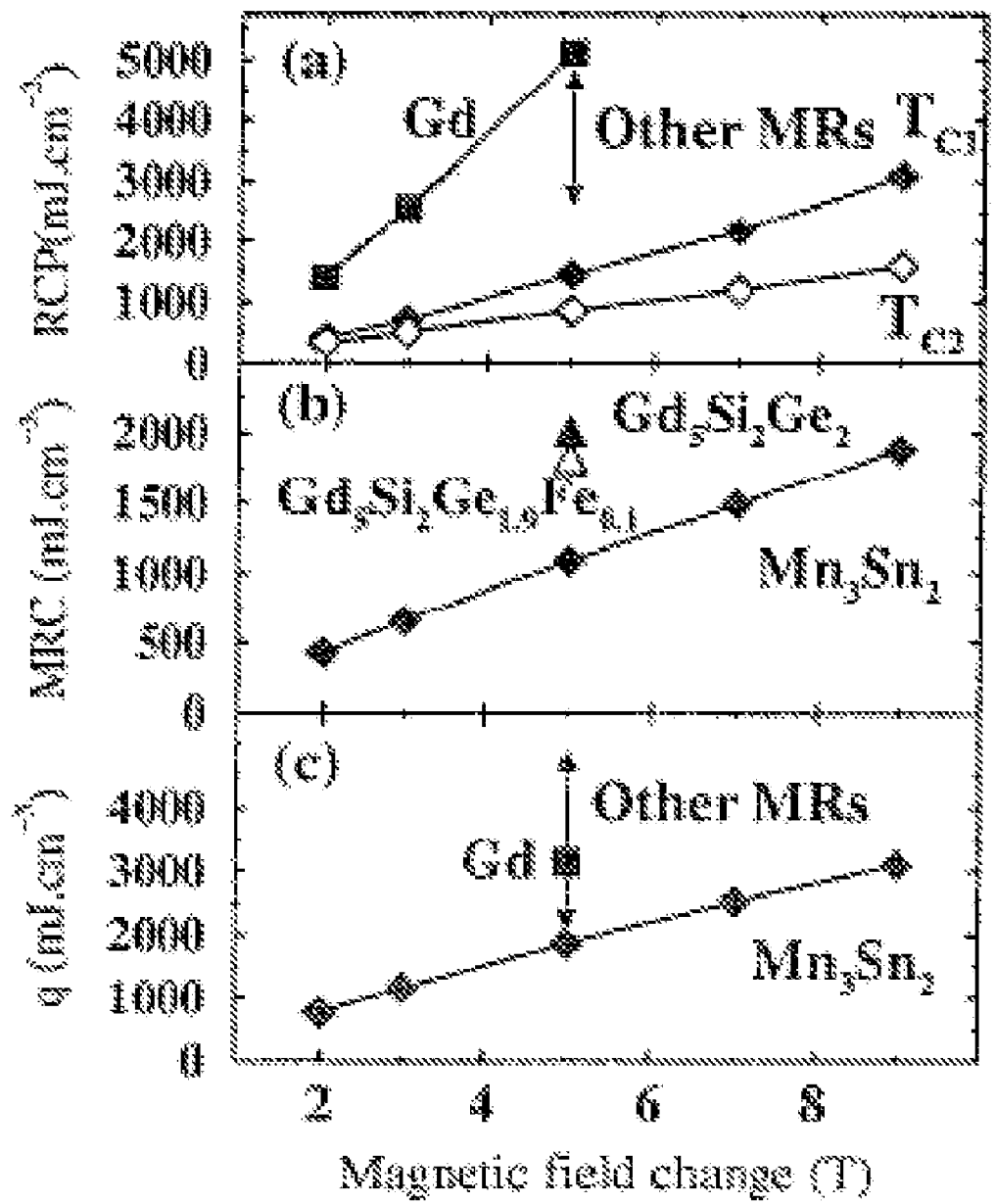
FIG. 5 represents the results obtained with the different methods of evaluating the refrigerant capacity (RC) for $Mn_3Sn_2$ and known magnetocaloric compounds:
(a) relative cooling power (RCP),
(b) maximum refrigerant capacity (MRC),
(c) cooling capacity (q).
Figure 6:
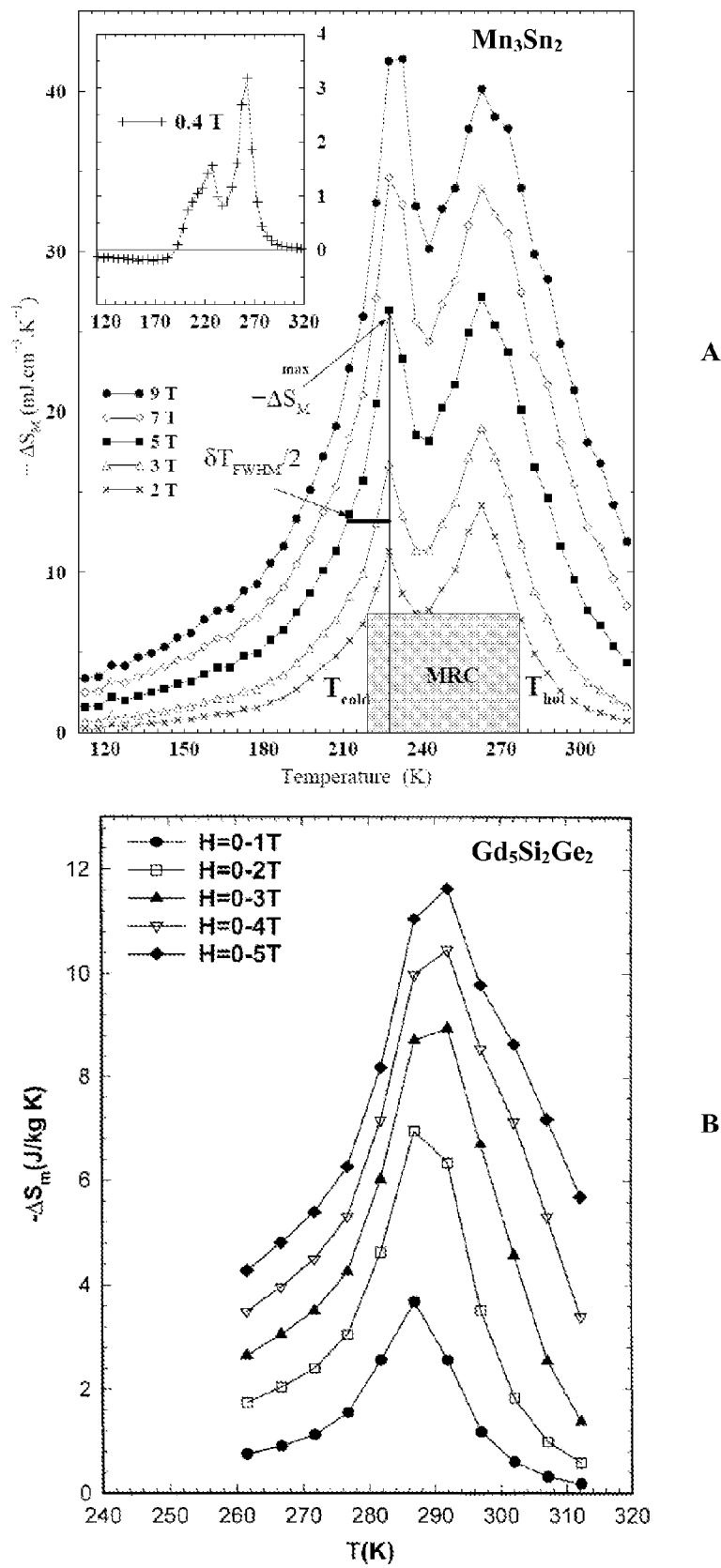
FIG. 6 represents the compared thermal variation of the magnetic entropy versus temperature of $Mn_3Sn_2$ and $Gd_5Si_2Ge_2$ at different applied fields (upper slide (A) : $Mn_3Sn_2$ and lower slide (B): $Gd_5Si_2Ge_2$).
Figure 7:
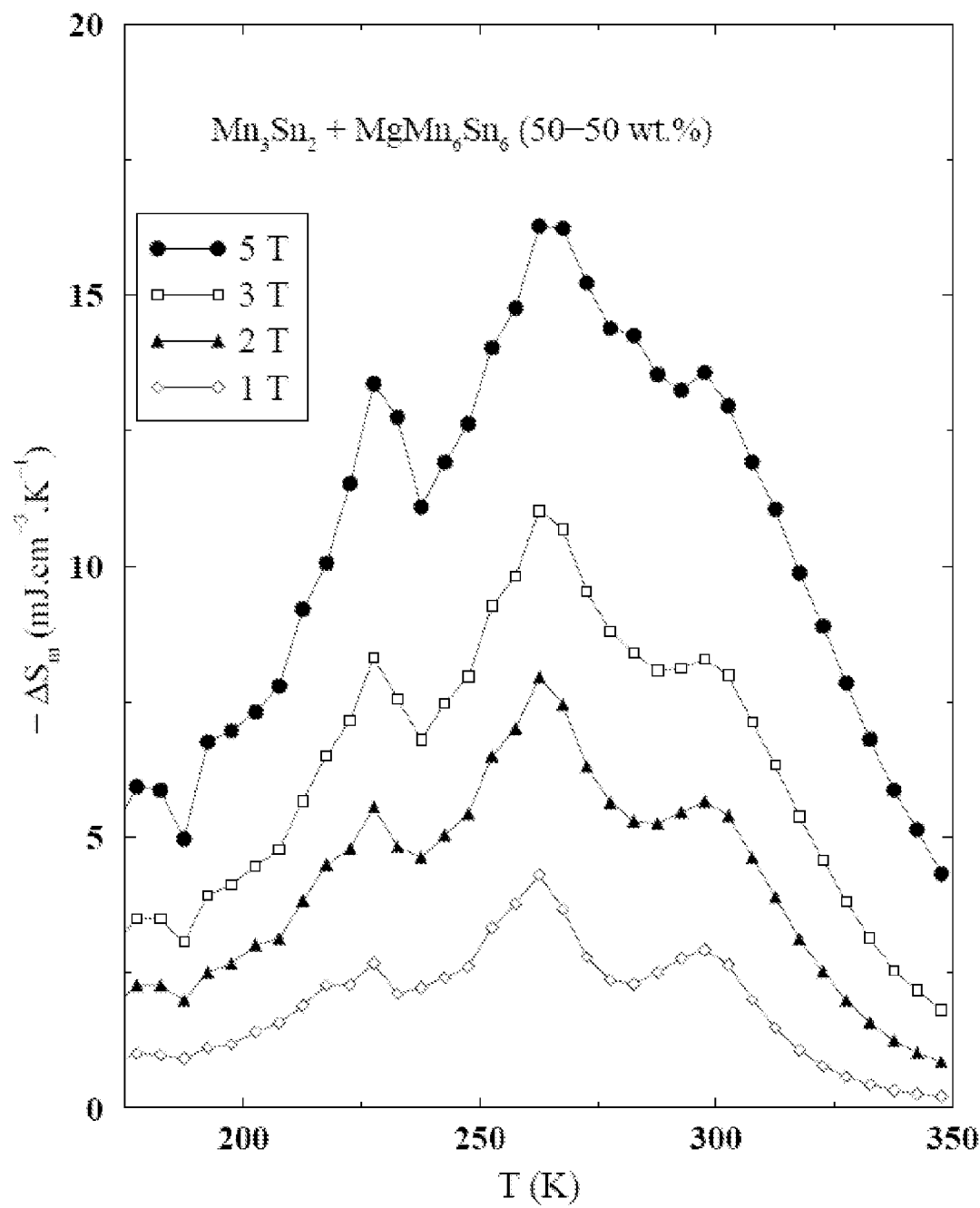
FIG. 7 represents the thermal variation of the magnetic entropy versus temperature of the $Mn_3Sn_2$ and $MgMn_6Sn_6$ composition (50/50, w/w) for field changes of 5 T, 3 T, 2 T and 1 T.
Figure 8:
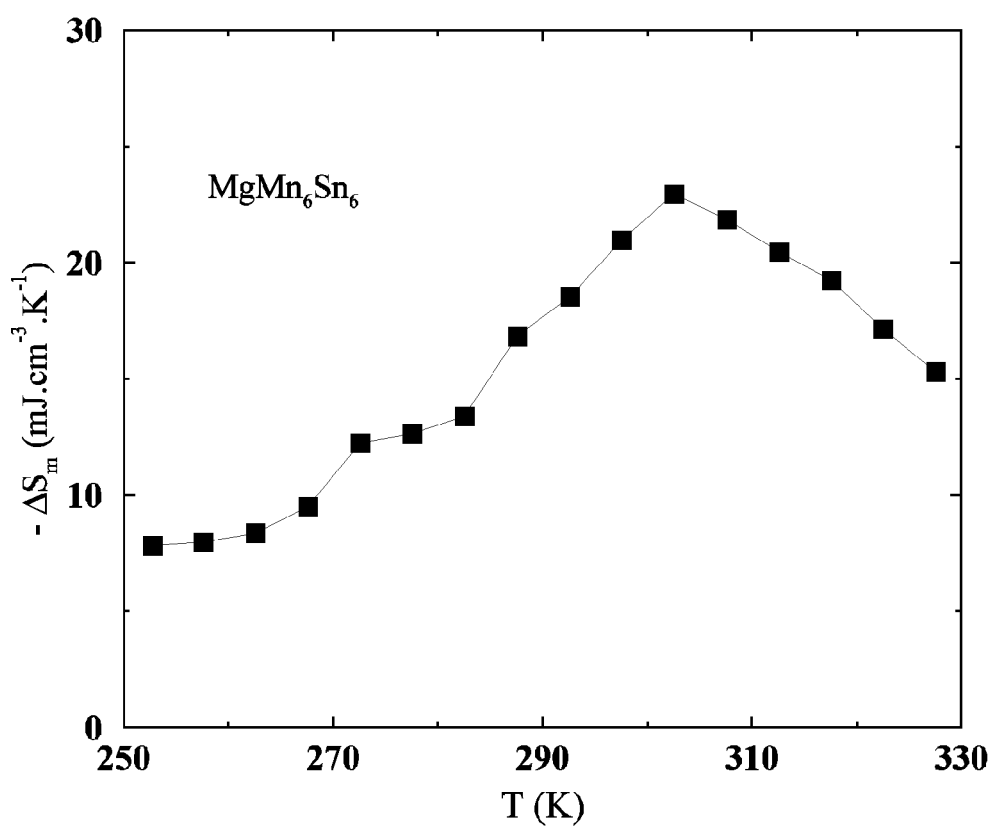
FIG. 8 represents the thermal variation of the magnetic entropy versus temperature of $MgMn_6Sn_6$ alone for a field change of 5 T.
Figure 9:
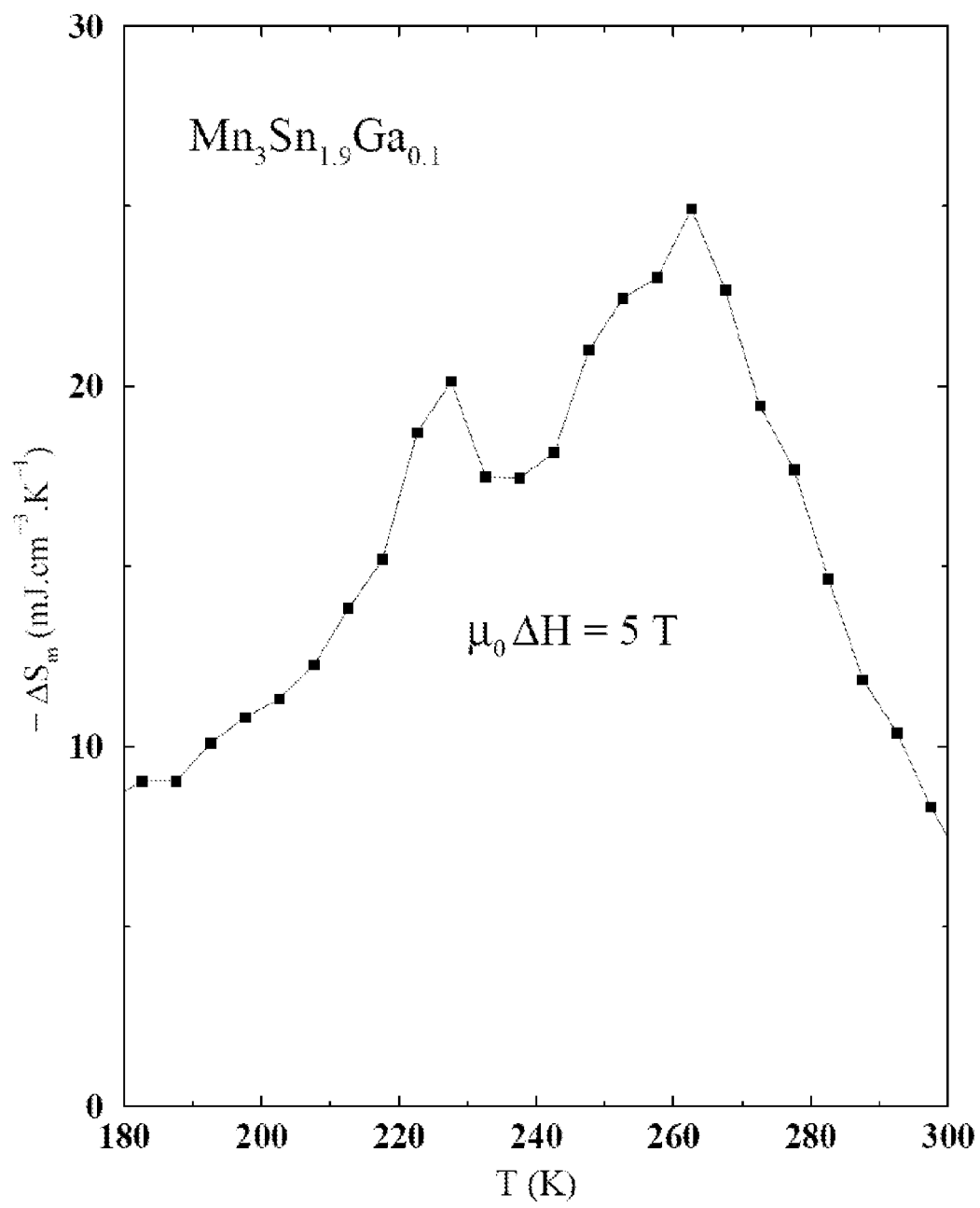
FIG. 9 represents the thermal variation of the magnetic entropy versus temperature of $Mn_3Sn_{2-x}Ga_x$ alone for a field change of 5 T, for x=0.1.
Figure 10:
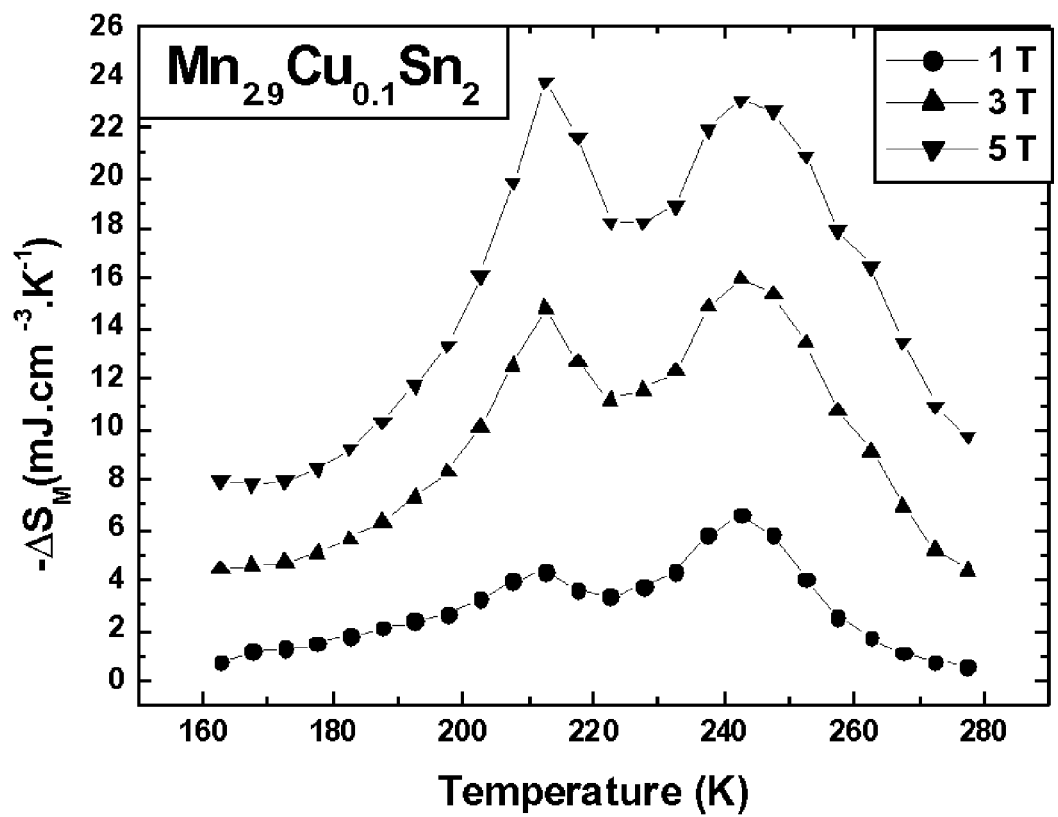
FIG. 10 represents the thermal variation of the magnetic entropy versus temperature of $Mn_{2.9}Cu_{0.1}Sn_2$ for field changes of 5 T, 3 T and 1 T.
Figure 11:
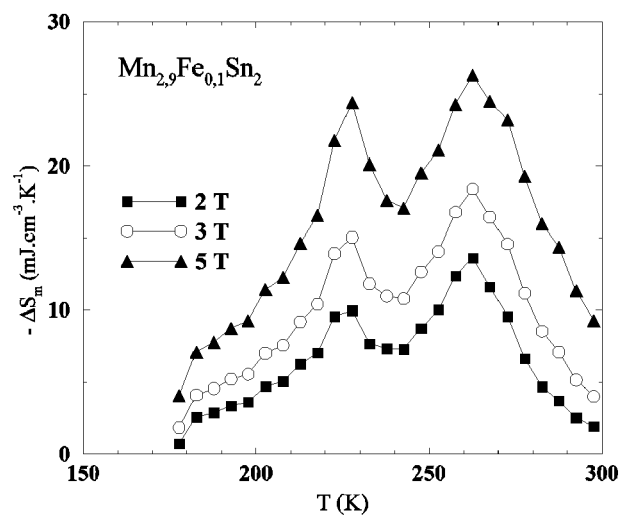
FIG. 11 represents the thermal variation of the magnetic entropy versus temperature of $Mn_{3-x}Fe_xSn_2$ for a field change of 5 T for x=0.1 (A), 0.2 (B), 0.5 (C).
Figure 11:
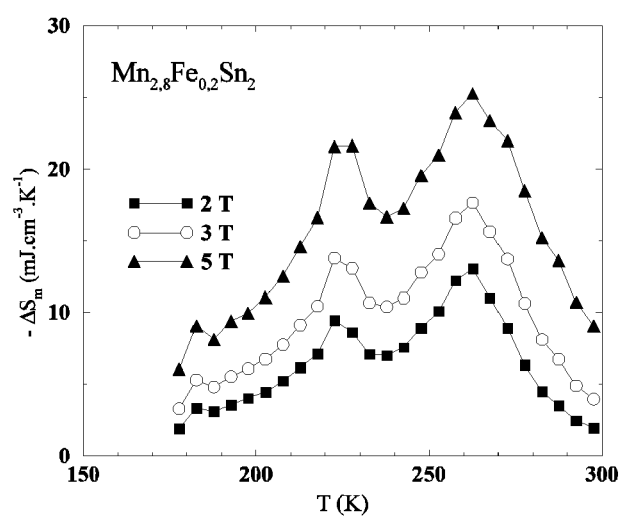
Figure 11:
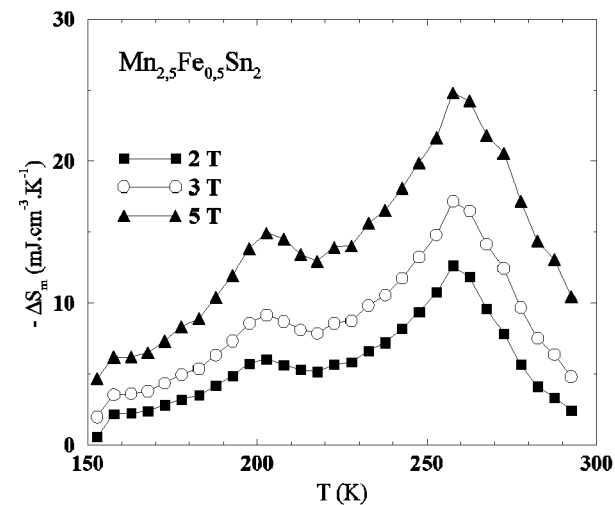
Figure 12:
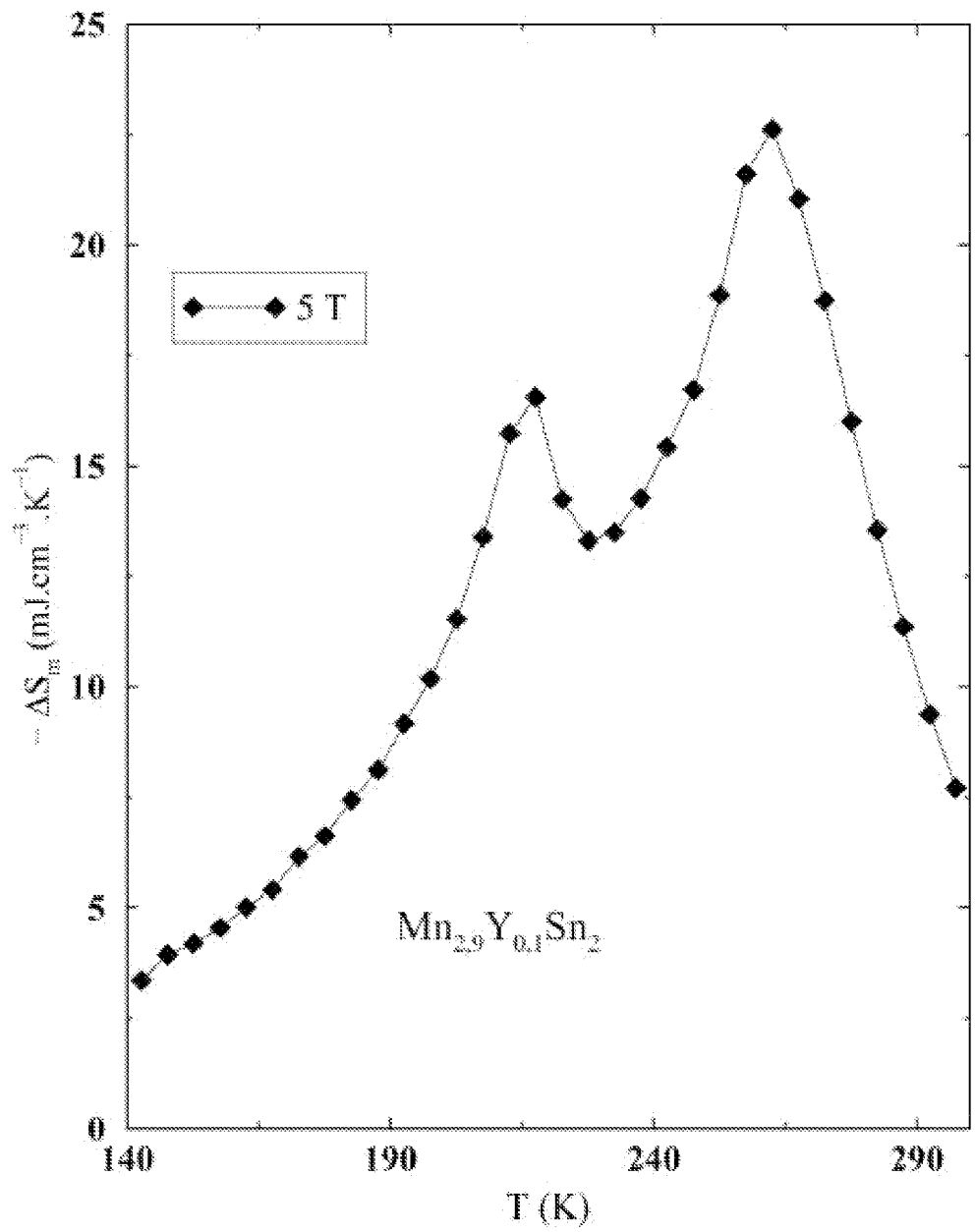
FIG. 12 represents the thermal variation of the magnetic entropy versus temperature of $Mn_{2.9}Y_{0.1}Sn_2$ for a field change of 5 T.
Figure 13:
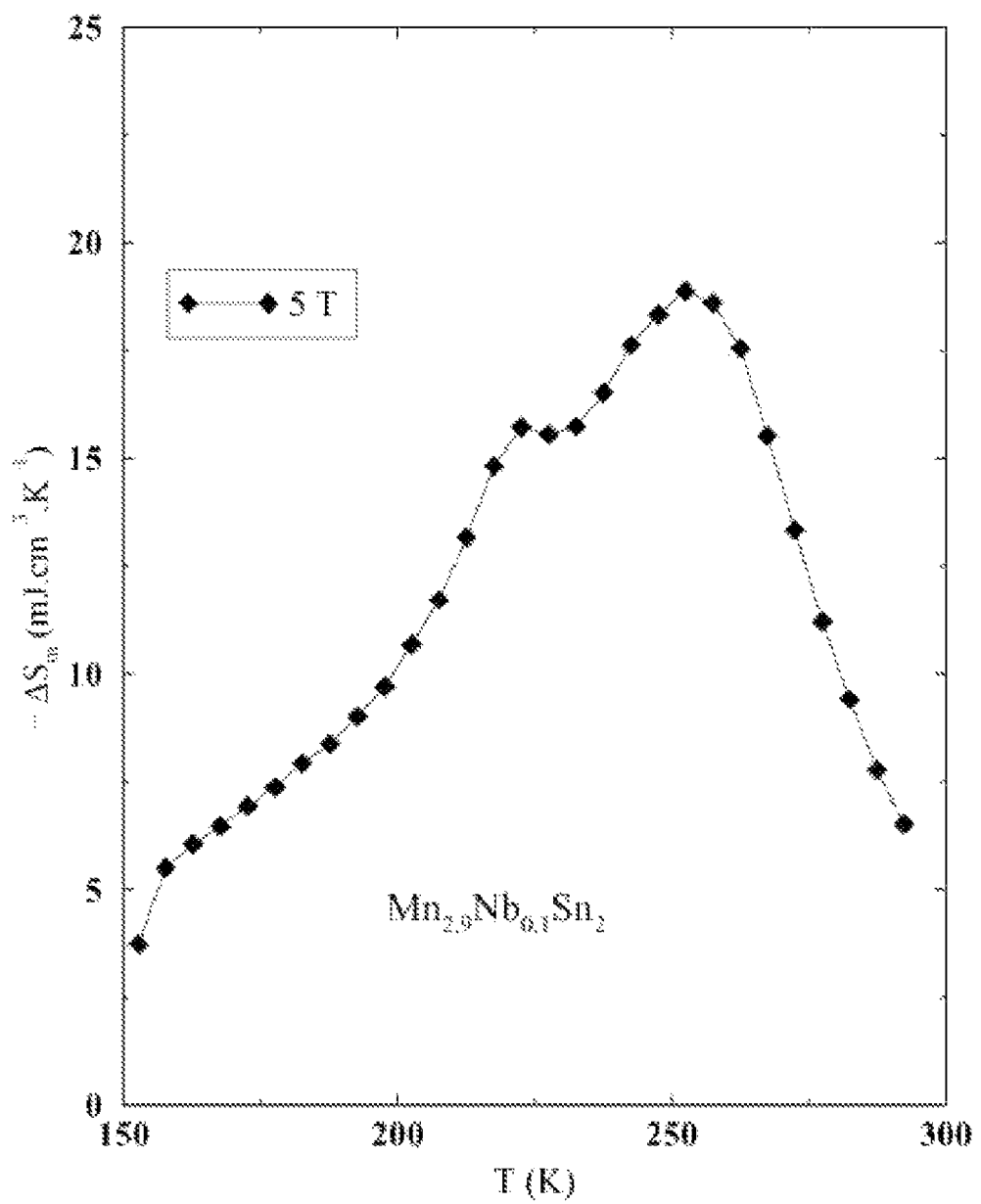
FIG. 13 represents the thermal variation of the magnetic entropy versus temperature of $Mn_{2.9}Nb_{0.1}Sn_2$ for a field change of 5 T.
Figure 14:
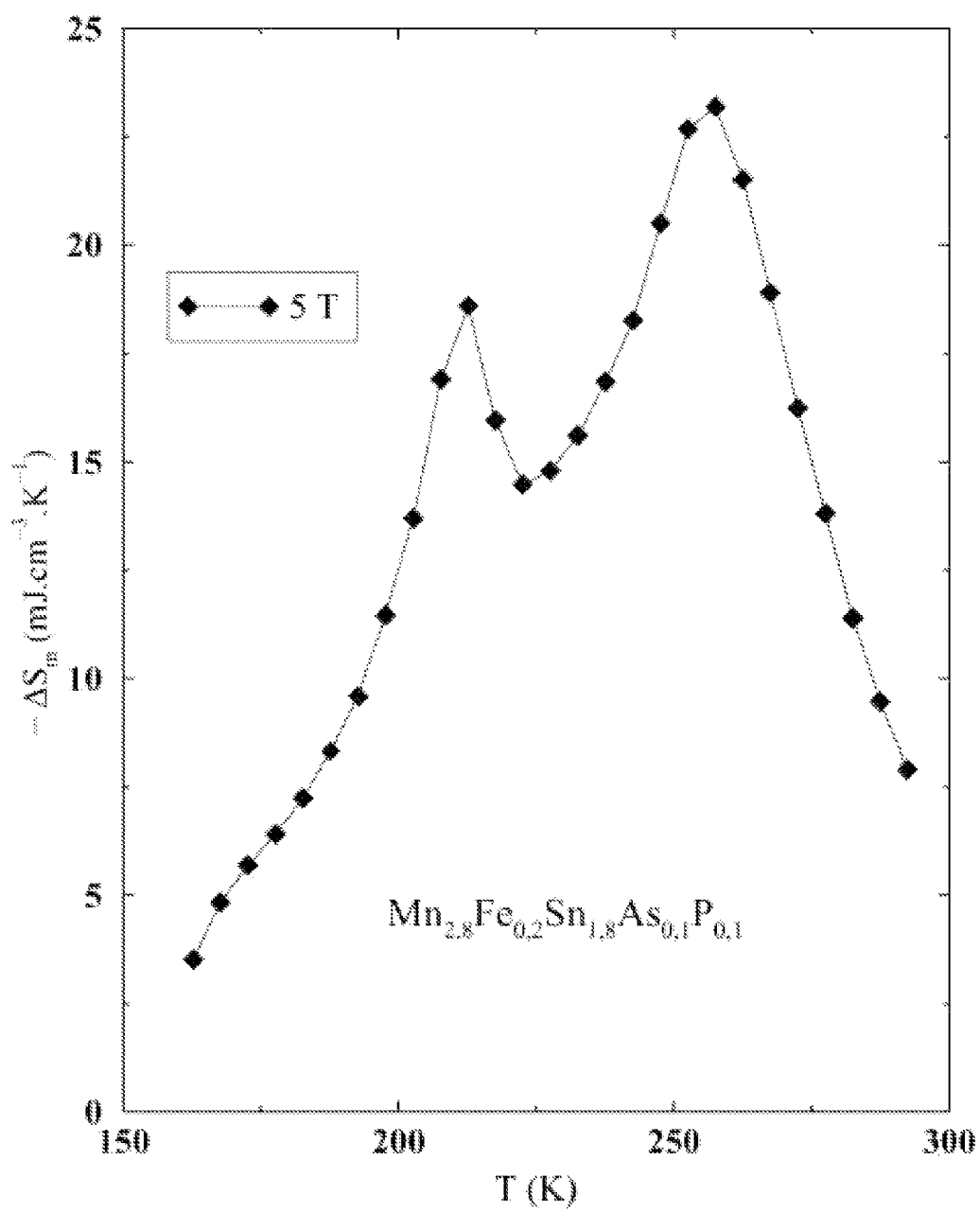
FIG. 14 represents the thermal variation of the magnetic entropy versus temperature of $Mn_{2.8}Fe_{0.2}Sn_{1.8}As_{0.1}P_{0.1}$ for a field change of 5 T.
Figure 15:
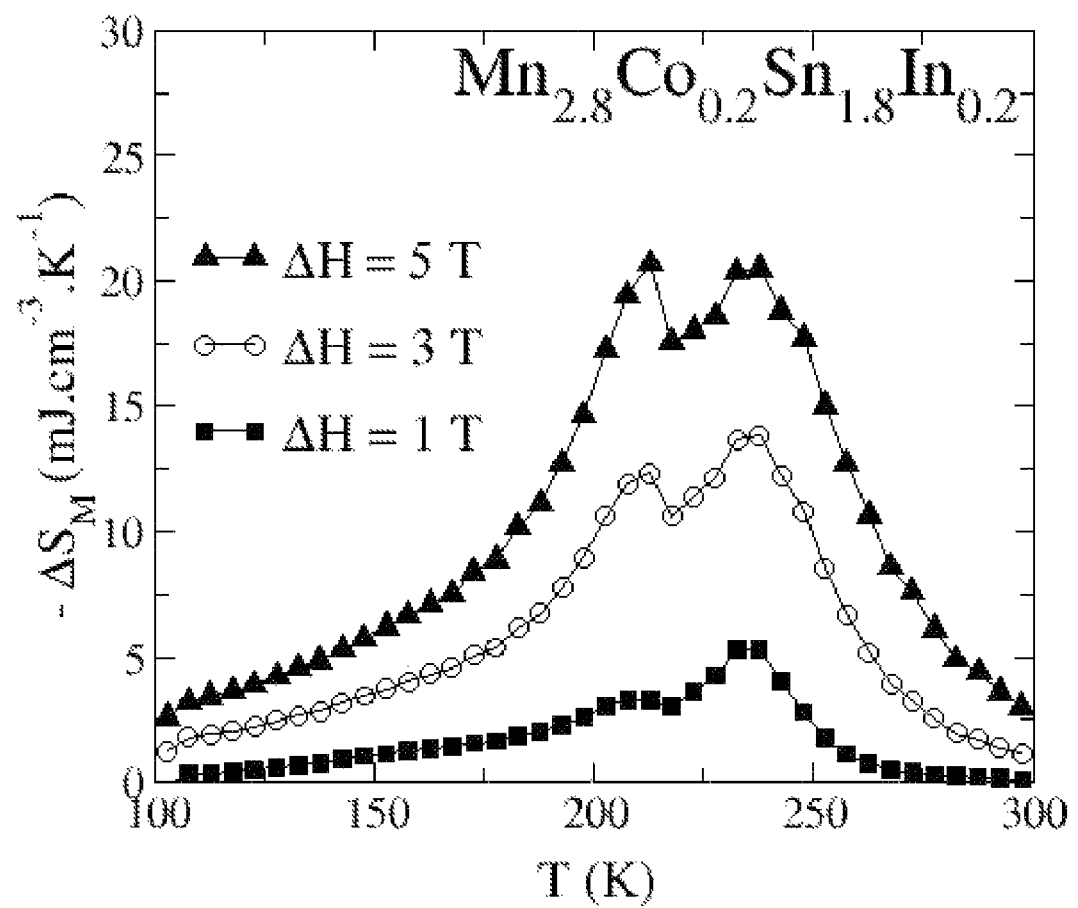
FIG. 15 represents the thermal variation of the magnetic entropy versus temperature of $Mn_{2.8}Co_{0.2}Sn_{1.8}In_{0.2}$ for a field change of 5 T, 3 T and 1 T.
Figure 16:
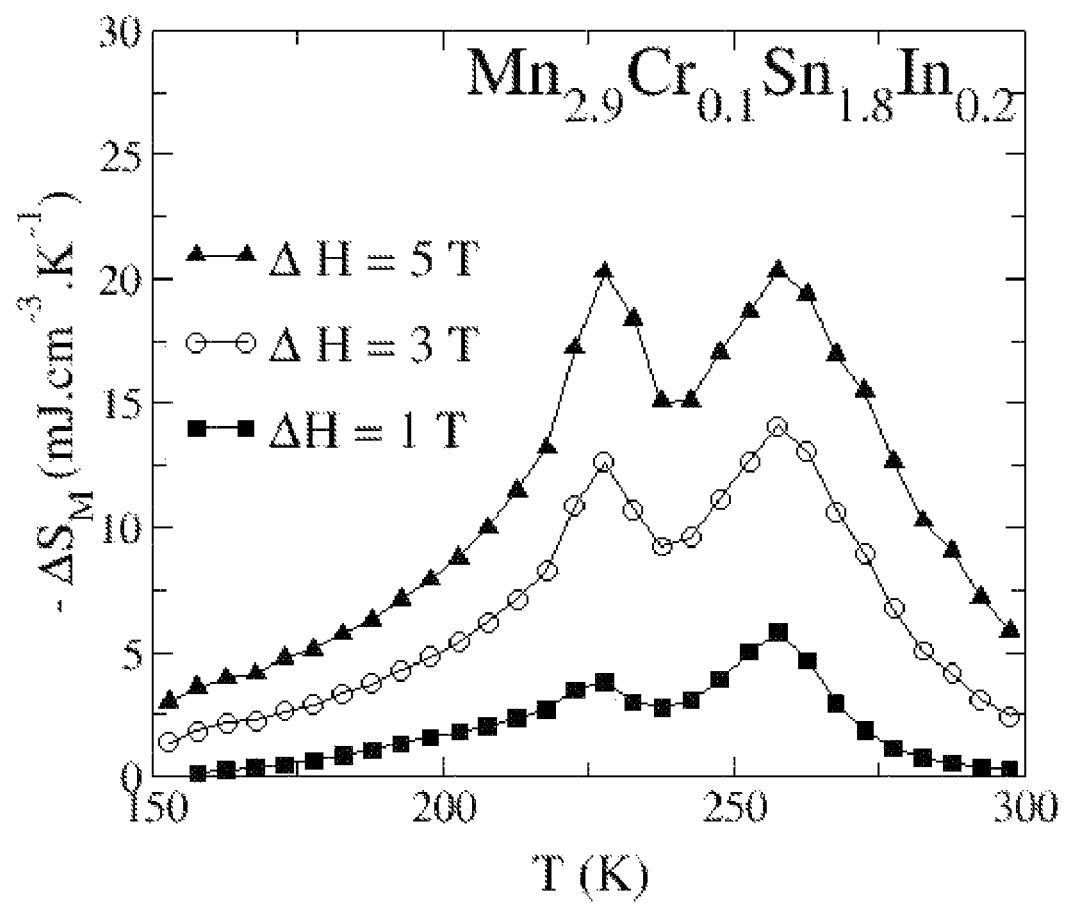
FIG. 16 represents the thermal variation of the magnetic entropy versus temperature of $Mn_{2.9}Cr_{0.1}Sn_{1.8}In_{0.2}$ for a field change of 5 T, 3 T and 1 T.

1) General Procedure for the Synthesis of the Different Compounds (Except Compounds with Zr, Hf, Nb):

The alloys and compounds with general composition $Mn_{3-(x+x'\eta)}T_xT'_xSn_{2-(y+y'\eta)}X_yX'_y$ are prepared by mixing the pure commercially available elements, having a quality 3N, in suitable weight proportion. The mixtures can be mixed by hand or ball-milled to obtain an amorphous or micro-crystalline mixture in order to reduce the annealing time. The resulting mixtures are compressed into pills using for instance a steel die. The pellets are then enclosed into silica tubes sealed under inert atmosphere (e.g. 300 mm Hg of purified argon) to avoid any oxidization during the thermal treatment. The sintering stage (i.e. the first thermal treatment) is conducted between 300 and 600° C., preferably at 500° C. during 3-5 days. At this temperature Sn, one of the main constituent, is in liquid state. The quartz ampoule is then quenched in water and the pellets are tightly ground by hand. The crushed mixtures are then compacted again, and introduced into silica tubes sealed under inert atmosphere. The pellets are then subsequently heated for two weeks (annealing) before to be quenched in ice/water. This part of the synthesis procedure can be conducted between 450° C. and 480° C.

For alloys with T/T'=Zr, Hf, Nb, Mo and/or X/X'=Ge it is important to operate the annealing above 650° C. After this two-week annealing, the pellets are tightly ground again, compacted, introduced into silica ampoules under protective atmosphere.

This alternate procedure can also be applied for other compounds, i.e. T/T'≠Zr, Hf, Nb, Mo and/or X/X'=Ge.

The final thermal treatment must be conducted below 480° C. (preferably between 450 and 480° C.) for at least one weak whatever the composition to be sure to stabilize the $Ni_3Sn_2$ type of structure and not the lacunary $Ni_2In$-type which is formed at higher temperatures.

Indeed, that is the $Ni_3Sn_2$-type which yields the desired and unusual two-peak magnetocaloric effect whereas compounds which crystallize in the lacunary $Ni_2In$-type only display a single peak. After this final heating, the samples are quenched in ice/water.

2) Characteristics of the Compounds

Some of the different compounds synthesized have been characterized by their X-ray diffraction pattern.

The crystallographic data of the compounds are given in Table III.

TABLE III

| Compound | a (Å) | b (Å) | c (Å) |
|---|---|---|---|
| $Mn_3Sn_2$ | 7.558(1) | 5.501(1) | 8.584(2) |
| $Mn_{2.9}Fe_{0.1}Sn_2$ | 7.552(1) | 5.500(1) | 8.580(1) |
| $Mn_{2.8}Fe_{0.2}Sn_2$ | 7.548(1) | 5.498(1) | 8.574(2) |
| $Mn_{2.5}Fe_{0.5}Sn_2$ | 7.538(2) | 5.484(1) | 8.555(2) |
| $Mn_3Sn_{1.9}Ga_{0.1}$ | 7.556(1) | 5.493(1) | 8.596(1) |
| $Mn_{2.9}Cu_{0.1}Sn_2$ | 7.549(1) | 5.504(1) | 8.580(1) |

3) Synthesis of the Compositions (A, B)

To prepare the (A,B) hybrid material, powders of the A and B compounds can be mixed by hand (or ball-milled) or can be arranged into layers in necessary order (i.e. the compound with the higher ordering temperature near the hot end, the compound with the lower ordering temperature near the cold end).

4) Schematic Functioning of the Magnetic Refrigeration and the Heat Pump

Figure 17:
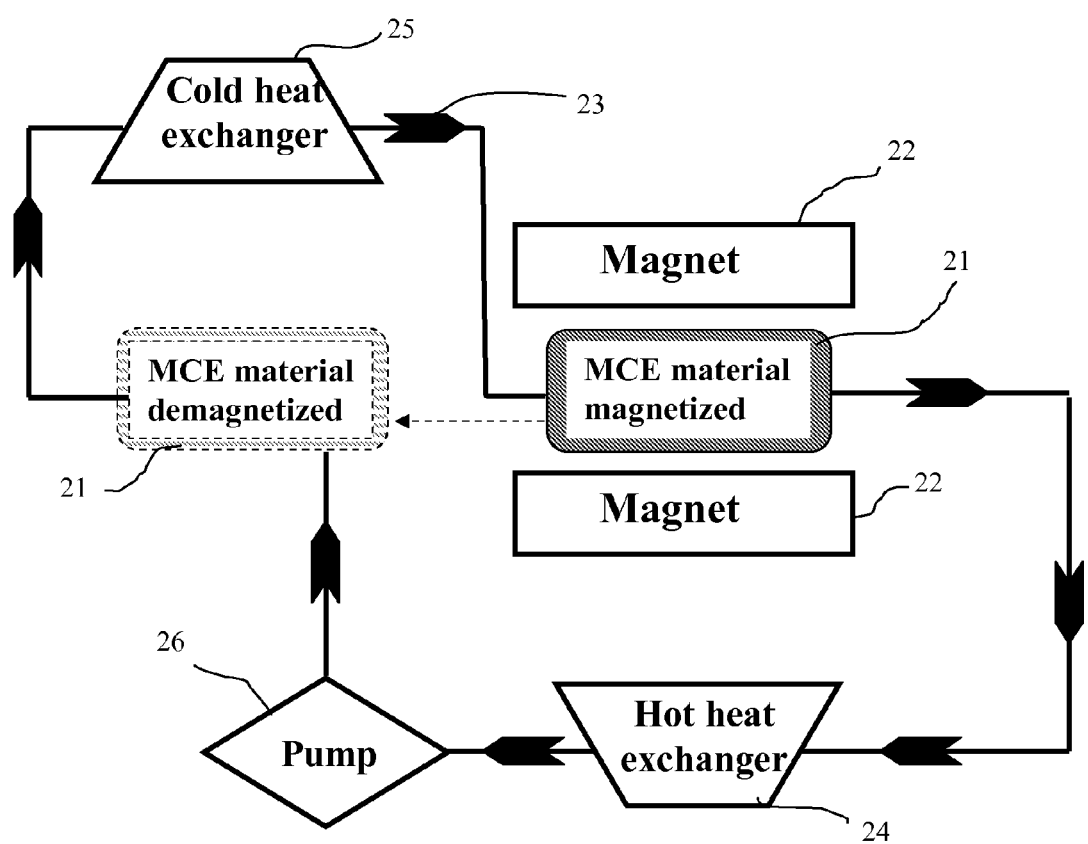
FIG. 17 is a schematic view illustrating an embodiment of a refrigeration system utilizing a magnetocaloric material according to the present invention.

FIG. 17 illustrates a working principle of the magnetic refrigeration using a magnetocaloric material according to the present invention. It concerns an example of a magnetic refrigeration system in which the magnetocaloric material 21 (MCE material) according to the invention is adapted for operation. This magnetic refrigeration system is characterized by a linear displacement of the magnetocaloric material 21 between two positions. Into the first position, the magnetocaloric material 21 is magnetized thanks to a permanent magnet 22 surrounding said magnetocaloric material 21. Whereas, into a second position, as depicted in dotted line in FIG. 17, the magnetocaloric material 21 is demagnetized as it is out of the permanent magnet 22. Conventional means of known type, not shown, may be utilized to provide linear displacement of the magnetocaloric material 21. Another variant may consist in a displacement of the permanent magnet 22 with a fixed magnetocaloric material 21. A flow 23 of a heat transfer fluid is controllably passed through the magnetocaloric material 21, a hot heat exchanger 24 and a cold heat exchanger 25 with the aid of conventional means such as a pump 26. The operation of the system as illustrated in FIG. 17 may be embodied in a cyclic manner in order to obtain magnetic refrigeration. At the beginning of the cycle, the system is at room temperature or below. A magnetic field in then applied to the magnetocaloric material 21 with the permanent magnet 22 (Neodyne magnet, 0.1-10 Hz) causing an alignment of the material moments and thus an increase of the temperature.

The temperature is then exchanged with the hot heat exchanger 24, allowing the magnetocaloric material 21 to return to the initial temperature.

The magnetocaloric material 21 is demagnetized by switching off the applied field, causing an alignment of the material moments and thus a decrease of the temperature below the room temperature.

The temperature is then exchanged with a cold heat exchanger 25 (refrigerator).

The working principle of the heat pump is the same as above, except the hot and cold sources are switched.

5) Arrangement of a Magnetic Refrigeration System

Figure 18:
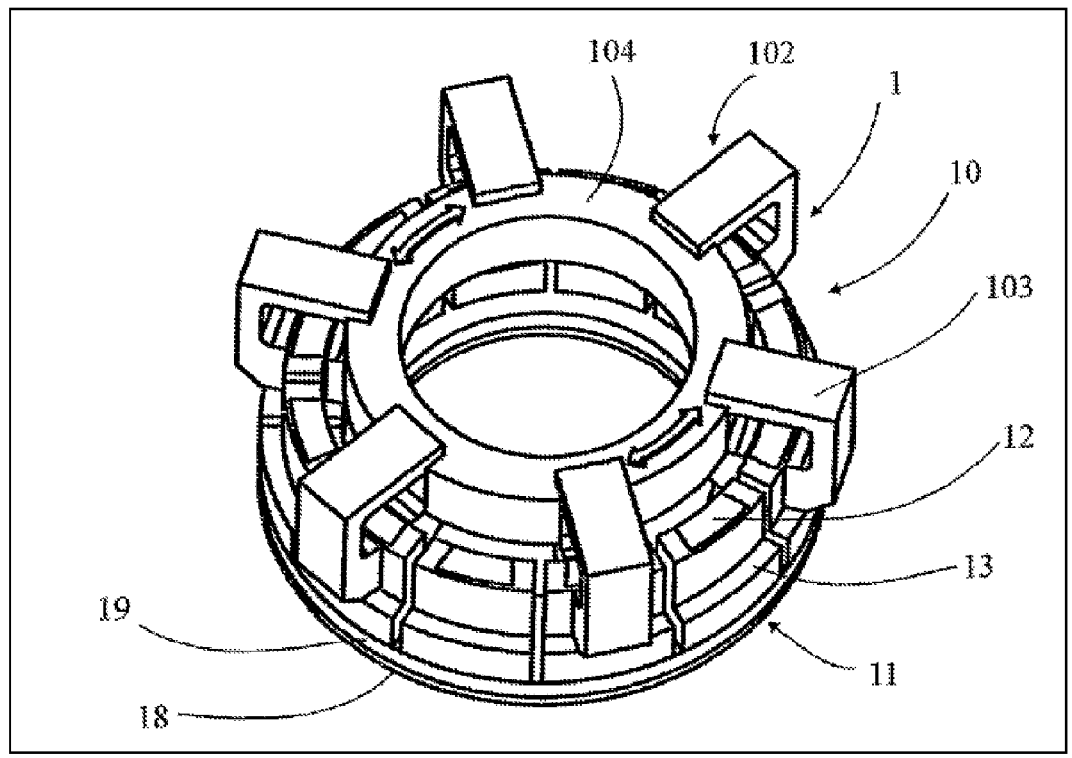
FIG. 18 represents a schematic view of the arrangement of a magnetic refrigeration system (WO 2005/043052).

An example of magnetic refrigeration system using the magnetocaloric compounds or compositions of the present invention is represented in FIG. 18.

This system 1 is composed of a thermic flux generator 10 comprising twelve thermic parts 11 forming a circle and containing the magnetocaloric compound or the compositions of the invention (500 g-1 kg) 12. Each thermic part 11 is connected to a thermically conductor element 13 which transmits the hot (or cold) heat from 12 to 11, depending if the field is applied or not by means of magnet elements 102, 103 fixed on a mobile support 104. Thermic parts 11 are fixed on a plate 18 and separated by a seal 19. Both plate and seal are pierced allowing the exchange with a heat transfer fluid.

The magnetocaloric compounds or the compositions of the invention introduced in 12 can be under the form of a powder, a multi layer powder, a pill, a block.

The invention claimed is:

1. A method of implementation of a magnetocaloric agent, introducing to a magnetic refrigeration system at least one compound having the following general formula (I) and a crystalline structure of $Ni_3Sn_2$ type:

$$Mn_{3-(x+x')}T_xT'_{x'}Sn_{2-(y+y')}X_yX'_{y'} \qquad (I)$$

in which:
T and T' are selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu,
X and X' are selected from the group consisting of: Ga, Ge, Sb, In, Al, Cd, As, P, C, and Si,
x, x', y and y' are from 0 to 1
$x+x' \leq 0.5$,
$y+y' \leq 0.5$,
$x+y \leq 1$, and
provided that x+x'+y+y' is different from 0.

2. The method according to claim 1, wherein said at least one compound has the following general formula (II) and a crystalline structure of $Ni_3Sn_2$ type:

$$Mn_{3-(x+x')}T_xT'_{x'}Sn_{2-y}X_y \qquad (II)$$

in which:
T and T' are selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu,
X is selected from the group consisting of: Ga, Ge, Sb, In, Al, Cd, As, P, C, and Si,
x, x', y are all different from 0, and
$x+x' \leq 0.5$ and $x+y \leq 1$.

3. The method according to claim 1, wherein said at least one compound has the following general formula (III) and a crystalline structure of $Ni_3Sn_2$ type:

$$Mn_{3-x}T_xSn_{2-(y+y')}X_yX'_{y'} \qquad (III)$$

in which:
T is selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu,
X and X' are selected from the group consisting of: Ga, Ge, Sb, In, Al, Cd, As, P, C, and Si,
$x+x' \leq 0.5$, $y+y' \leq 0.5$, and $x+y \leq 1$, and
x, y, y' are all different from 0.

4. The method according to claim 1, wherein said at least one compound has the following general formula (II) and a crystalline structure of $Ni_3Sn_2$ type:

$$Mn_{3-x}T_xSn_{2-y}X_y \qquad (IV)$$

in which:
T is selected from the group consisting of: Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu,
X is selected from the group consisting of: Ge, Sb, In, Al, Cd, C, and Si,
$x+y \leq 1$; and
x+y is different from 0.

5. The method according to claim 1, wherein said at least one compound has the following general formula (IV) and a crystalline structure of $Ni_3Sn_2$ type:

$$Mn_{3-x}T_xSn_{2-y}X_y \qquad (IV)$$

in which:
T is selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu,
X is selected from the group consisting of: Ga, Ge, Sb, In, Al, Cd, As, P, C, and Si,
x and y are different from 0, and
$x+y \leq 1$.

6. The method according to claim 1, wherein said at least one compound has the following general formula (V) and a crystalline structure of $Ni_3Sn_2$ type:

$$Mn_{3-x}T_xSn_2 \qquad (V)$$

in which:
T is selected from the group consisting of: Zr, Hf, Nb, Mo, and a rare earth element selected from the group consisting of: La, Ce, Pr, Nd, Pm, Sm, Eu, Gd, Tb, Dy, Ho, Er, Tm, Yb, Sc, Y, and Lu, and
x is different from 0.

7. The method according to claim 1, wherein said at least one compound has the following general formula (VI) and a crystalline structure of $Ni_3Sn_2$ type:

$$Mn_3Sn_{2-y}X_y \qquad (VI)$$

in which:
X is selected from the group consisting of: Ge, In, Al, Cd, As, P, C, and Si, and
y is different from 0.

8. The method according to claim 1, wherein the said at least one compound has a cooling capacity q for a magnetic field applied from 0 to about 5 T is from about 50 mJ/cm³ to about 5000 mJ/cm³.

9. The method according to claim 1, wherein said at least one compound comprises two peaks which are in a temperature range from about 50 K to about 550 K.

10. A method of implementation of a magnetocaloric agent, introducing to a magnetic refrigeration system a composition having the following general formula (VII):

$$(A, B) \qquad (VII)$$

in which:
A is at least one compound selected from the group consisting of:
a first magnetocaloric material having the following general formula (I) and a crystalline structure of $Ni_3Sn_2$ type:

$$Mn_{3-(x+x')}T_xT'_{x'}Sn_{2-(y+y')}X_yX'_{y'} \qquad (I)$$

in which:
T and T' are selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu,
X and X' are selected from the group consisting of: Ga, Ge, Sb, In, Al, Cd, As, P, C, and Si,
x, x', y and y' are from 0 to 1,
$x+x' \leq 0.5$, y+y'≦0.5, and x+x'+y+y'≦1, B is at least a second magnetocaloric material having a transition peak from about 290 to about 340 K chosen from the group consisting of Gd, $MgMn_6Sn_6$, $Mn_4Ga_2Sn$, $Gd_5Si_{4-z}Ge_z$, $Gd_5(Si_{1-z}Ge_z)_4$, and $MnFeP_{1-z}As_z$, z being from 0 to 1.

11. The method according to according to claim 10, wherein the ratio (w/w) between A and B is from about 0.01 to about 99.

12. The method according to claim 10, wherein the composition has a cooling capacity for a magnetic field applied from about 0 to about 5 T is from about 50 mJ/cm³ to about 5000 mJ/cm³.

13. The method according to claim 10, wherein said peaks are in a temperature range from about 50 K to about 600 K.

14. The method according to claim 10, wherein the temperature range between at least two adjacent peaks is from about 50 K to about 100 K.

15. A magnetocaloric material having the following general formula (I) and a crystalline structure of $Ni_3Sn_2$ type:

$$Mn_{3-(x+x')}T_xT'_{x'}Sn_{2-(y+y')}X_yX'_{y'} \quad (I)$$

in which:
T and T' are selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu, X and X' are selected from the group consisting of: Ga, Ge, Sb, In, Al, Cd, As, P, C, and Si, x, x', y and y' are from 0 to 1, x+x'≦0.5, y+y'≦0.5, and x+x'+y+y'≦1, provided that x+x'+y+y' is different from 0.

16. The magnetocaloric material according to claim 15, having the following general formula (I):

$$Mn_{3-(x+x')}T_xT'_{x'}Sn_{2-(y+y')}X_yX'_{y'} \quad (I)$$

in which:
T and T' are selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu, X and X' are selected from the group consisting of: Ga, Ge, Sb, In, Al, Cd, As, P, C, and Si, x+x'≦0.5, y+y'≦0.5, x+x'+y+y'≦1, and x, x', y and y' are all different from 0.

17. The magnetocaloric material according to claim 15, having the following general structure (II):

$$Mn_{3-(x+x')}TxT'x'Sn_{2-y}X_y \quad (II)$$

in which:
T and T' are selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu, X is selected from the group consisting of: Ga, Ge, Sb, In, Al, Cd, As, P, C, and Si, x+x'≦0.5, x+y≦1, and x, x', y are all different from 0.

18. The magnetocaloric material according to claim 15, having he following general structure (III):

$$Mn_{3-x}T_xSn_{2-(y+y')}X_yX'_{y'} \quad (III)$$

in which:
T is selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu, X and X' are selected from the group consisting of: Ga, Ge, Sb, In, Al, Cd, As, P, C, and Si, x+x'≦0.5, y+y'≦0.5, x+y≦1, and x, y, y' are all different from 0.

19. The magnetocaloric material according to claim 15, having the following general formula (IV):

$$Mn_{3-x}T_xSn_{2-y}X_y \quad (IV)$$

in which:
T is selected from the group consisting of: Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu, X is selected from the group consisting of: Ge, In, Al, Cd, C, and Si, x+y≦1; provided that x+y is different from 0.

20. The magnetocaloric material according to claim 15, having the following general formula (IV):

$$Mn_{3-x}T_xSn_{2-y}X_y \quad (IV)$$

in which:
T is selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu, X is selected from the group consisting of: Ga, Ge, Sb, In, Al, Cd, As, P, C, and Si, x and y are different from 0, and x+y≦1.

21. The magnetocaloric material according to claim 15, having the following general formula (V):

$$Mn_{3-x}T_xSn_2 \quad (V)$$

in which:
T is selected from the group consisting of: Zr, Hf, Nb, and a rare earth element selected from the group consisting of: La, Ce, Pr, Nd, Sm, Eu, Gd, Tb, Dy, Ho, Er, Tm, Yb, Sc, Y, and Lu, and x is different from 0.

22. The magnetocaloric material according to claim 15, having the following general formula (VI) and a crystalline structure of $Ni_3Sn_2$ type:

$$Mn_3Sn_{2-y}X_y \quad (VI)$$

in which:
X is selected from the group consisting of: Ge, In, Al, Cd, As, P, C, and Si, and y is different from 0.

23. The magnetocaloric material according to claim 15 having a formula chosen from the group consisting of:

$Mn_{3-x}Fe_xSn_{2-y}Ga_y$, wherein 0≦x≦0.5 and 0≦y≦0.5, $Mn_{3-x}Fe_xSn_{2-y}Ge_y$, wherein 0≦x≦0.5 and 0≦y≦0.5, $Mn_{3-x}Fe_xSn_{2-y}In_y$, wherein 0≦x≦0.5 and 0≦y≦0.5, $Mn_{3-x}Fe_xSn_{2-y}Sb_y$, wherein 0≦x≦0.5 and 0≦y≦0.5, $Mn_{3-x}Co_xSn_{2-y}Ga_y$, wherein 0≦x≦0.5 and 0≦y≦0.5, $Mn_{3-x}Co_xSn_{2-y}Ge_y$, wherein 0≦x≦0.5 and 0≦y≦0.5, $Mn_{3-x}Co_xSn_{2-y}In_y$ wherein $0 \leq x \leq 0.5$ and $0 \leq 0.5$,
$Mn_{3-x}Cr_xSn_{2-y}In_y$ wherein $0 \leq x \leq 0.5$ and $0 \leq y \leq 0.5$,
$Mn_{3-x}Co_xSn_{2-y}Sb_y$ wherein $0 \leq x \leq 0.5$ and $0 \leq y \leq 0.5$,
$Mn_{3-x}Ni_xSn_{2-y}Ga_y$ wherein $0 \leq x \leq 0.5$ and $0 \leq y \leq 0.5$,
$Mn_{3-x}Ni_xSn_{2-y}Ge_y$ wherein $0 \leq x \leq 0.5$ and $0 \leq y \leq 0.5$,
$Mn_{3-x}Ni_xSn_{2-y}In_y$ wherein $0 \leq x \leq 0.5$ and $0 \leq y \leq 0.5$,
$Mn_{3-x}Ni_xSn_{2-y}Sb_y$ wherein $0 \leq x \leq 0.5$ and $0 \leq y \leq 0.5$,
$Mn_{3-x}Nb_xSn_{2-y}Ga_y$ wherein $0 \leq x \leq 0.5$ and $0 \leq y \leq 0.5$,
$Mn_{3-x}Nb_xSn_{2-y}Ge_y$ wherein $0 \leq x \leq 0.5$ and $0 \leq y \leq 0.5$,
$Mn_{3-x}Nb_xSn_{2-y}In_y$ wherein $0 \leq x \leq 0.5$ and $0 \leq y \leq 0.5$,
$Mn_{3-x}Nb_xSn_{2-y}Sb_y$ wherein $0 \leq x \leq 0.5$ and $0 \leq y \leq 0.5$,
$Mn_{3-x}Zn_xSn_{2-y}Ga_y$ wherein $0 \leq x \leq 0.5$ and $0 \leq y \leq 0.5$,
$Mn_{3-x}Zn_xSn_{2-y}Ge_y$ wherein $0 \leq x \leq 0.5$ and $0 \leq y \leq 0.5$,
$Mn_{3-x}Zn_xSn_{2-y}In_y$ wherein $0 \leq x \leq 0.5$ and $0 \leq y \leq 0.5$, and
$Mn_{3-x}Zn_xSn_{2-y}Sb_y$ wherein $0 \leq x \leq 0.5$ and $0 \leq y \leq 0.5$.
$Mn_{3-x}Fe_xSn_{2-(y+y')}As_yP_{y'}$ wherein $0 \leq x \leq 0.5$ and $0 \leq y \leq 0.5$, and $0 \leq y' \leq 0.5$.

24. The magnetocaloric material according to claim 15, having a formula chosen from the group consisting of:
$Mn_3Sn_{2-y}Ge_y$ where $0 \leq y \leq 0.5$,
$Mn_{3-x}Nb_xSn_2$ where $0 \leq x \leq 0.5$,
$Mn_{3-x}Y_xSn_2$ where $0 \leq x \leq 0.5$.
$Mn_{3-x}Co_xSn_{2-y}In_y$ wherein $0 \leq x \leq 0.5$ and $0 \leq y \leq 0.5$,
$Mn_{3-x}Cr_xSn_{2-y}In_y$ wherein $0 \leq x \leq 0.5$ and $0 \leq y \leq 0.5$, and
$Mn_{3-x}Fe_xSn_{2-(y+y')}As_yP_{y'}$ wherein $0 \leq x \leq 0.5$ and $0 \leq y \leq 0.5$, and $0 \leq y' \leq 0.5$.

25. The magnetocaloric composition having the following general formula (VII):

$$(A, B) \quad (VII)$$

in which:
A is at least one first magnetocaloric material selected from the group consisted of:
a compound having the following general formula (I) and a crystalline structure of $Ni_3Sn_2$ type:

$$Mn_{3-(x+x')}T_xT'_{x'}Sn_{2-(y+y')}X_yX'_{y'} \quad (I)$$

in which:
T and T' are selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu,
X and X' are selected from the group consisting of: Ga, Ge, Sb, In, Al, Cd, As, P, C, and Si,
x, x', y and y' are from 0 to 1,
$x+x' \leq 0.5$,
$y+y' \leq 0.5$, and
$x+x'+y+y' \leq 1$,
B is at least a second magnetocaloric material having a transition peak comprised from about 290 to about 340 K chosen from the group consisting of Gd, $MgMn_6Sn_6$, $Mn_4Ga_2Sn$, $Gd_5Si_{4-z}Ge_z$, $Gd_5(Si_{1-z}Ge_z)_4$, and $MnFeP_{1-x}As_z$,
z being comprised from 0 to 1.

26. The magnetocaloric composition according to claim 25, wherein the ratio (w/w) between A and B is from about 0.01 to about 99.

27. The magnetocaloric composition according to claim 25, said A and B, respectively, chosen from the group consisting of:
$Mn_3Sn_2$ and Gd,
$Mn_3Sn_2$ and $MgMn_6Sn_6$,
$Mn_3Sn_2$ and $Mn_4Ga_2Sn$,
$Mn_3Sn_2$ and $Gd_5Si_{4-z}Ge_z$, $Gd_5(Si_{1-z}Ge_z)_4$,
$Mn_3Sn_2$ and $MnFeP_{1-z}As_z$,
$Mn_{3-x}Fe_2$ and Gd,
$Mn_{3-x}Fe_xSn_2$ and $MgMn_6Sn_6$,
$Mn_{3-x}Fe_xSn_2$ and $Mn_4Ga_2Sn$,
$Mn_{3-x}Fe_xSn_2$ and $Gd_5(Si_{1-z})_4$,
$Mn_{3-x}Fe_xSn_2$ and $Gd_5Si_{4-z}Ge_z$, and
$Mn_{3-x}Fe_xSn_2$ and $MnFeP_{1-z}As_z$,
x and z being as previously defined.

28. The method according to claim 1, wherein said at least one compound has the following general formula (I) and a crystalline structure of $Ni_3Sn_2$ type:

$$Mn_{3-(x+x')}T_xT'_{x'}Sn_{2-(y+y')}X_yX'_{y'} \quad (I)$$

in which:
T and T' are selected from the group consisting of: Ti, V, Cr, Fe, Co, Ni, Cu, Zn, Ru, Zr, Hf, Nb, Mo, and a rare earth element selected from the group consisting of: La, Ce, Pr, Nd, Sm, Eu, Gd, Tb, Dy, Ho, Er, Tm, Yb, Sc, Y, and Lu,
X and X' are selected from the group consisting of: Ga, Ge, Sb, In, Al, Cd, As, P, C, and Si,
x, x', y and y' are all different from 0,
$x+x' \leq 0.5$,
$y+y' \leq 0.5$, and
$x+y \leq 1$.

* * * * *